(12) United States Patent
Joshi et al.

(10) Patent No.: US 11,017,121 B2
(45) Date of Patent: May 25, 2021

(54) INFORMATION AUTHENTICATION METHOD, APPARATUS, STORAGE MEDIUM AND VIRTUAL REALITY DEVICE BASED ON VIRTUAL REALITY SCENARIO

(71) Applicant: TENCENT TECHNOLOGY (SHENZHEN) COMPANY LIMITED, Guangdong (CN)

(72) Inventors: Dhaval Jitendra Joshi, Shenzhen (CN); Wei Wang, Shenzhen (CN); Zuo Qi Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 50 days.

(21) Appl. No.: 15/980,127

(22) Filed: May 15, 2018

(65) Prior Publication Data
US 2018/0260584 A1    Sep. 13, 2018

Related U.S. Application Data

(63) Continuation of application No. PCT/CN2017/096044, filed on Aug. 4, 2017.

(30) Foreign Application Priority Data

Aug. 4, 2016    (CN) .......................... 201610633377.X
Aug. 3, 2017    (CN) .......................... 201710658057.4

(51) Int. Cl.
*G06F 21/00*    (2013.01)
*G06F 21/64*    (2013.01)
(Continued)

(52) U.S. Cl.
CPC .............. *G06F 21/64* (2013.01); *G06F 3/011* (2013.01); *G06F 9/455* (2013.01); *G06F 21/36* (2013.01);
(Continued)

(58) Field of Classification Search
None
See application file for complete search history.

(56) References Cited

U.S. PATENT DOCUMENTS 9,077,846 B2 *   7/2015   Pradeep ................. H04N 7/157
9,092,600 B2 *   7/2015   Scavezze ............... H04L 63/08
(Continued)

FOREIGN PATENT DOCUMENTS

CN    101145238 A    3/2008
CN    101360119 A    2/2009
(Continued)

OTHER PUBLICATIONS

Steven LaValle, "Virtual Reality: Chapters, The Geometry of Virtual Worlds", Feb. 2016, University of Illinois, p. 60-86. (Year: 2016).*
(Continued)

*Primary Examiner* — Jeffery L Williams
(74) *Attorney, Agent, or Firm* — Sughrue Mion, PLLC

(57) ABSTRACT

An information authentication method, an apparatus, a storage medium and a virtual reality device are provided. The method includes obtaining to-be-authenticated information in the virtual reality scenario. The method further includes sending the to-be-authenticated information to an authentication device in a reality scenario, wherein the authentication device is used for performing authentication on the to-be-authenticated information. The method further includes receiving, in the virtual reality scenario, an authentication result sent by the authentication device, wherein the authentication result indicates that the to-be-authenticated information is authenticated successfully or fails to be authenticated.

16 Claims, 18 Drawing Sheets

(51) Int. Cl.
  *G06F 9/455* (2018.01)
  *H04L 29/06* (2006.01)
  *G06F 3/01* (2006.01)
  *G06F 21/36* (2013.01)
  *G06K 7/14* (2006.01)
  *H04L 29/08* (2006.01)
  *G06K 7/10* (2006.01)

(52) U.S. Cl.
  CPC ............ *H04L 63/08* (2013.01); *G06K 7/1417* (2013.01); *G06K 2007/10524* (2013.01); *H04L 67/34* (2013.01); *H04L 67/38* (2013.01)

(56) References Cited

U.S. PATENT DOCUMENTS

| | | | | |
|---|---|---|---|---|
| 2006/0217623 | A1* | 9/2006 | Morganroth | A61B 5/0452 600/509 |
| 2010/0138755 | A1* | 6/2010 | Kulkarni | G06F 21/33 715/757 |
| 2010/0229235 | A1* | 9/2010 | Dawson | H04L 9/006 726/22 |
| 2010/0299747 | A1* | 11/2010 | Hamilton, II | H04L 9/3247 726/19 |
| 2012/0154434 | A1* | 6/2012 | Costea | G06F 16/29 345/629 |
| 2013/0312086 | A1* | 11/2013 | Hamilton, II | G09C 5/00 726/18 |
| 2014/0058812 | A1* | 2/2014 | Bender | G06Q 30/0209 705/14.12 |
| 2014/0125574 | A1* | 5/2014 | Scavezze | G06F 21/36 345/156 |
| 2014/0215592 | A1* | 7/2014 | Yang | H04L 63/1483 726/7 |
| 2015/0128292 | A1* | 5/2015 | Malecki | G02B 27/017 726/28 |
| 2015/0168729 | A1* | 6/2015 | Kobayashi | G06F 3/012 345/156 |
| 2016/0012465 | A1* | 1/2016 | Sharp | G06Q 20/18 705/14.17 |
| 2016/0057135 | A1* | 2/2016 | Jiang | H04L 63/0853 713/172 |
| 2016/0071094 | A1* | 3/2016 | Krishnaiah | G06Q 20/363 705/66 |
| 2016/0180594 | A1* | 6/2016 | Todeschini | G06T 19/006 345/633 |
| 2016/0188861 | A1* | 6/2016 | Todeschini | G06F 21/32 726/7 |
| 2016/0188943 | A1* | 6/2016 | Franz | G06K 7/10841 705/21 |
| 2017/0364920 | A1* | 12/2017 | Anand | H04L 63/0861 |
| 2018/0117447 | A1* | 5/2018 | Tran | G06Q 20/02 |
| 2019/0060602 | A1* | 2/2019 | Tran | G16H 20/30 |

FOREIGN PATENT DOCUMENTS

| | | |
|---|---|---|
| CN | 102541448 A | 7/2012 |
| CN | 106293876 A | 1/2017 |

OTHER PUBLICATIONS

D. Coetzee, "Capturing Virtual Worlds: A Method for Taking 360 Virtual Photos and Videos", Jun. 30, 2016, http://blog.dsky.co/capturing-virtual-worlds-a-method-for-taking-360-virtual-photos-and-videos/, accessed Jan. 13, 2021, p. 1-12. (Year: 2016).*

Alex Colgan, "The Alignment Problem: How to Position Cameras for Augmented Reality", Jun. 23, 2015, https://blog.leapmotion.com/alignment-problem-position-cameras-augmented-reality/, accessed Jan. 13, 2021, pg. (Year: 2015).*

International Search Report for PCT/CN2017/096044 dated Sep. 28, 2017 [PCT/ISA/210].

* cited by examiner

INFORMATION AUTHENTICATION METHOD, APPARATUS, STORAGE MEDIUM AND VIRTUAL REALITY DEVICE BASED ON VIRTUAL REALITY SCENARIO

CROSS-REFERENCE TO RELATED APPLICATION

This application is a continuation of International Patent Application No. PCT/CN2017/096044, filed on Aug. 4, 2017, which claims priority from Chinese Patent Application No. 201610633377.X, filed with the Chinese Patent Office on Aug. 4, 2016 and entitled "AUTHENTICATION METHOD AND APPARATUS BASED ON VIRTUAL REALITY SCENARIO", and Chinese Patent Application No. 201710658057.4, filed in the Chinese Patent Office on Aug. 3, 2017 and entitled "AUTHENTICATION METHOD, APPARATUS AND STORAGE MEDIUM BASED ON VIRTUAL REALITY SCENARIO", the disclosures of which are incorporated by reference herein in their entirety.

BACKGROUND

1. Field

This application relates to the field of computer technologies, and specifically, relates to an information authentication method, an apparatus, a storage medium and a virtual reality device based on a virtual reality scenario.

2. Description of Related Art

Currently, many enterprises provide different products and services in a virtual scenario which facilitate creation of different commercialization models for a virtual reality (Virtual Reality, VR for short) scenario. Performing authentication on information in a virtual reality scenario requires an information authentication mechanism to be established for the virtual reality scenario. A related art process of establishing the information authentication mechanism is relatively complex.

A reality scenario already has an information authentication method, but the information authentication method in the reality scenario has not been used in the virtual reality scenario, and performing the authentication on the information in the virtual reality requires the information authentication method to be re-established in the virtual reality scenario, which is relatively complex.

For the foregoing problem of the information authentication method in the virtual reality in related technologies being complex, no effective solution has been provided currently.

SUMMARY

It is an aspect to provide an information authentication method, an apparatus, a storage medium and a virtual reality device based on a virtual reality scenario to at least resolve a technical problem of an information authentication method in a virtual reality in related technologies being complex.

According to an aspect of one or more example embodiments, there is provided a method. The method includes obtaining to-be-authenticated information in the virtual reality scenario. The method further includes sending the to-be-authenticated information to an authentication device in a reality scenario, wherein the authentication device is used for performing authentication on the to-be-authenticated information. The method further includes receiving, in the virtual reality scenario, an authentication result sent by the authentication device, wherein the authentication result indicates that the to-be-authenticated information is authenticated successfully or fails to be authenticated.

According to other aspects of one or more example embodiments, there is provided an obtaining unit, a sending unit, and a receiving unit related to the method.

BRIEF DESCRIPTION OF THE DRAWINGS

Example embodiments will be described below with reference to the accompanying drawings, in which.

DETAILED DESCRIPTION

To make a person skilled in the art understand the solutions in this application better, the following clearly and completely describes the technical solutions in the example embodiments of this application with reference to the accompanying drawings in the example embodiments of this application. Apparently, the described example embodiments are merely some but not all of the example embodiments of this application. All other example embodiments obtained by a person of ordinary skill in the art based on the example embodiments of this application without creative efforts shall fall within the protection scope of this application.

It should be noted that, in the specification, claims, and accompanying drawings of this application, the terms "first", "second", and so on are intended to distinguish between similar objects but do not necessarily indicate a specific order or sequence. It should be understood that used data may be interchanged in suitable situations so that the described example embodiments of this application may also be implemented in a sequence other than the sequence described herein or shown in the figure. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

According to an example embodiment of this application, an information authentication method based on a virtual reality scenario is provided.

Figure 1:
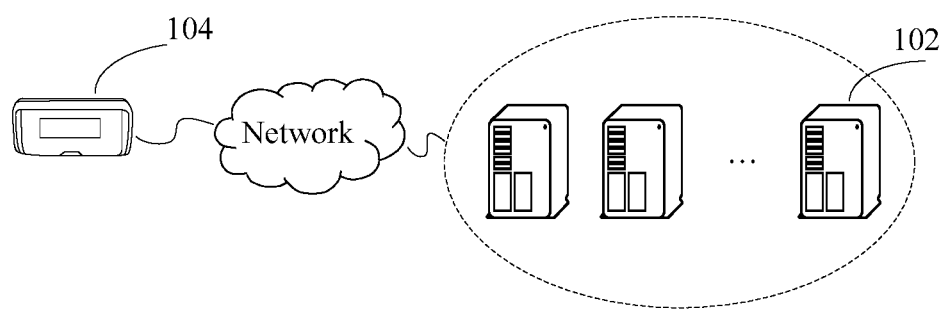
FIG. 1 is a hardware structural block diagram of an information authentication method based on a virtual reality scenario according to an example embodiment of this application.

In this example embodiment, the information authentication method based on the virtual reality scenario may be applied to a hardware environment constituted by an authentication device 102 and a virtual reality device 104 as shown in FIG. 1, and the hardware environment may be a hardware environment in the virtual reality scenario. As shown in FIG. 1, the authentication device 102 is connected to the virtual reality device 104 through a network, the network including but not limited to: a wide area network, a metropolitan area network or a local area network, and the virtual reality device 104 including but not limited to: a virtual reality helmet, a pair of virtual reality glasses, a virtual reality all-in-one machine or the like. The information authentication method based on the virtual reality scenario provided in this embodiment may be performed in the virtual reality scenario, by the authentication device 102, or may be performed by the virtual reality device 104, or may be performed by the authentication device 102 and the virtual reality device 104 collectively. The virtual reality device 104 performing the information authentication method based on the virtual reality scenario provided in this example embodiment of this application may also be performed by a client installed thereon.

Figure 2:
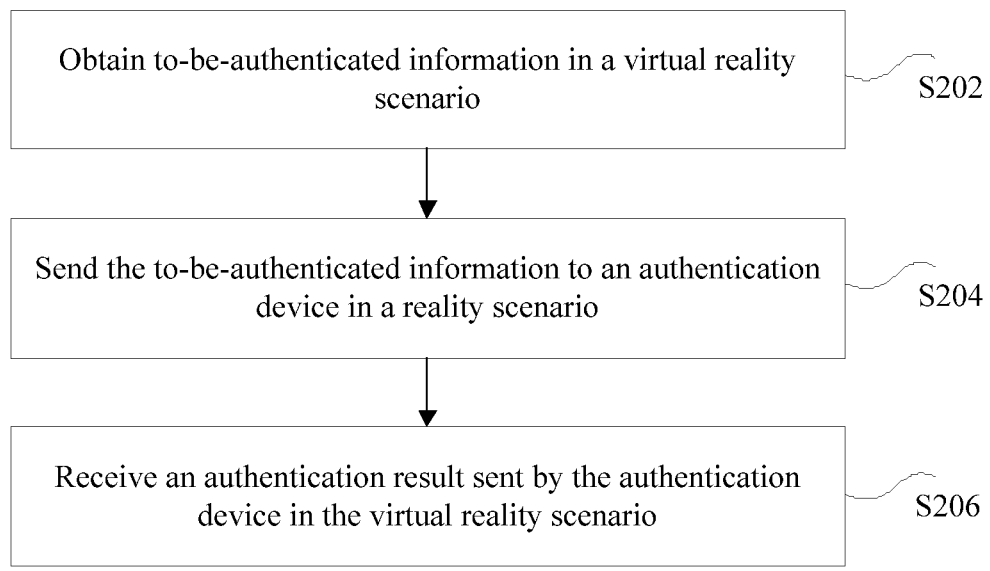
FIG. 2 is a flowchart of an information authentication method based on a virtual reality scenario according to an example embodiment of this application.

FIG. 2 is a flowchart of an information authentication method based on a virtual reality scenario according to an example embodiment of this application. As shown in FIG. 2, the information authentication method based on the virtual reality scenario may include the following steps:

S202: Obtain to-be-authenticated information in the virtual reality scenario.

In the technical solution provided in the foregoing step S202 according to this application, the to-be-authenticated information in the virtual reality scenario is obtained. A virtual reality technology is a computer emulation system on which a virtual world may be established and experienced, the computer emulation system may use a computer to generate a staging environment, aspects of which including: simulating an environment, awareness, a natural skill and a sensing device, and is multi-source information gathering and interactive emulation of a three-dimensional dynamic viewing and an entity behavior to make a user immerse in the environment. The virtual reality scenario has to-be-authenticated information, and the to-be-authenticated information may be information of authentication to be performed on a user in the virtual reality scenario, or information of authentication to be performed on a service in the virtual reality scenario. In some example embodiments, the virtual reality scenario has a virtual terminal that may obtain the to-be-authenticated information in the virtual reality scenario and may represent the to-be-authenticated information by using an image.

In some example embodiments, a virtual mobile phone in the virtual reality scenario or a controller (such as a control handle) of a virtual reality device may be used to activate a running program when the to-be-authenticated information is obtained in this example embodiment, to scan the image by using the program, so as to obtain the to-be-authenticated information in a virtual scenario represented in the image. The controller or a program running in a virtual reality terminal 104 may be used to control the virtual mobile phone in the virtual reality scenario to scan when the image in the virtual scenario is scanned. For example, the virtual mobile phone in the virtual reality scenario is controlled by the program to activate and scan a payment image when a payment scenario appears in the virtual reality scenario, to obtain the to-be-authenticated information in the virtual reality scenario.

Step S204: Send the to-be-authenticated information to an authentication device in a reality scenario.

In the technical solution provided in the foregoing step S204 according to this application, the to-be-authenticated information is sent to the authentication device in the reality scenario after the to-be-authenticated information in the virtual reality scenario is obtained, and the authentication device is used for performing authentication on the to-be-authenticated information and may be a device on which an application used for performing an authentication service exists. The application may be an instant messaging application.

In some example embodiments, a process of the foregoing authentication may include but is not limited to: comparing the to-be-authenticated information and information prestored on the authentication device, and determining that authentication succeeds if the two are the same, or otherwise, determining that authentication fails. For example, the to-be-authenticated information may be a group of digits: 1, 2, 3 and 4, and authentication may be determined to succeed if information prestored on the authentication device is also 1, 2, 3 and 4, or otherwise, authentication is determined to fail.

In some example embodiments, a process of the foregoing authentication may further include but is not limited to: the authentication device performs matching authentication on the to-be-authenticated information and matching information (such as a payment password) entered by a terminal (such as a terminal 303 shown in FIG. 3) in the reality scenario, and determining that authentication succeeds if the to-be-authenticated information matches the entered matching information, or otherwise, determining that authentication fails. In the foregoing scenario, the authentication device may prestore but is not limited to a corresponding relationship between the to-be-authenticated information and the matching information. For example, the to-be-authenticated information may include an account A and a payment amount B, an entered matching information includes: a payment password C, wherein it is determined that authentication succeeds if the corresponding relationship prestored on the authentication device includes: a corresponding relationship among the account A and the payment amount B and the payment password C, or otherwise, it is determined that authentication fails.

Figure 3:
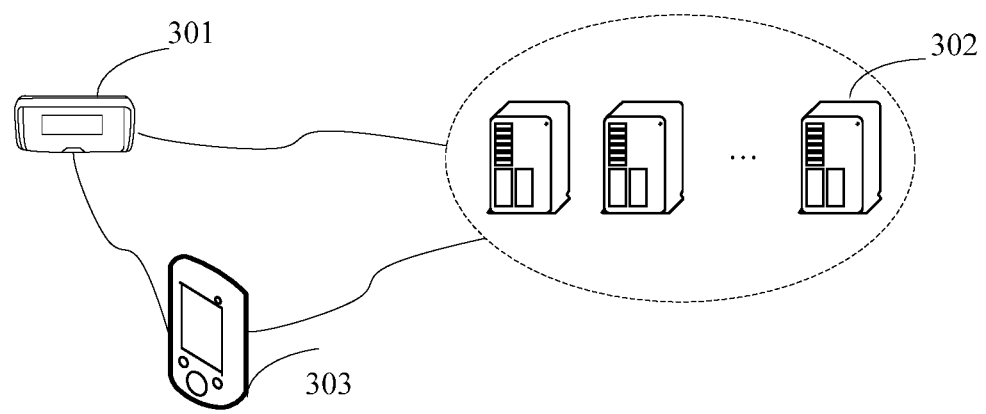
FIG. 3 is a schematic diagram of an information authentication system based on a virtual reality scenario according to an example embodiment of this application.

FIG. 3 is a schematic diagram of an information authentication system based on a virtual reality scenario according to an example embodiment of this application. As shown in FIG. 3, the system includes: a virtual reality device 301, an authentication device 302 and a terminal 303.

In some example embodiments, in the virtual reality scenario, the virtual reality device 301 may directly connect to the authentication device 302. The virtual reality device 301 obtains to-be-authenticated information in the virtual reality scenario, and sends the to-be-authenticated information to the authentication device 302 in a reality scenario, the authentication device 302 being used for performing authentication on the to-be-authenticated information. The virtual reality device 301 receives an authentication result sent by the authentication device 302, the authentication result being used for indicating that the to-be-authenticated information is authenticated successfully or fails to be authenticated, to resolve a technical problem that an information authentication method in a virtual reality is complex, so as to achieve a technical effect of simplifying the information authentication method in the virtual reality.

In some example embodiments, the virtual reality device 301 is connected to the authentication device 302 by the terminal 303. An API interface matching a type of the to-be-authenticated information is searched by the terminal 303, the terminal 303 sends the to-be-authenticated information in the virtual reality device 301 to the authentication device 302 through the API interface if the API interface matching the type of the to-be-authenticated information is found by the terminal 303, and the to-be-authenticated information may be sent to the authentication device 302 by using communications technologies, for example: a network, Bluetooth, infrared or the like. The authentication device 302 obtains the to-be-authenticated information and determines whether the to-be-authenticated information is authenticated successfully to obtain an authentication result, the authentication result including an authentication result that authentication succeeds and/or an authentication result that authentication fails. The authentication device 302 may send the authentication result to the terminal 303 by using communications technologies, for example: a network, Bluetooth, infrared or the like.

In some example embodiments, the foregoing authentication device 302 and the terminal 303 may be set in a same apparatus, or may be in different apparatuses.

In some example embodiments, the terminal 303 in the reality scenario receives an image displayed in the virtual reality scenario, the image being obtained by encoding the to-be-authenticated information; the terminal 303 decodes the image, to obtain the to-be-authenticated information, the encoding corresponding to the decoding; the terminal 303 searches the API interface matched to the type of the to-be-authenticated information; the terminal 303 sends the to-be-authenticated information to the authentication device 302 through the API interface if the terminal 303 finds the API interface matching the type of the to-be-authenticated information, and the terminal 303 receives the authentication result sent by the authentication device 302 in the virtual reality scenario, to avoid that performing authentication on information in a virtual reality needs to re-establish information authentication in the virtual reality scenario, thereby achieving an objective of performing authentication on the to-be-authenticated information in a virtual scenario and implementing a technical effect of simplifying an information authentication method in the virtual reality.

In some embodiments, the authentication device in the reality scenario is a hardware device that may be a terminal, or may be a server, may be distributed, or may be integrated. This is not limited in the example embodiments of this application. The example embodiments of this application may further include another form of the authentication device to achieve an objective of performing authentication on the to-be-authenticated information in a virtual scenario so as to implement a technical effect of simplifying an information authentication method in a virtual reality. No example is illustrated herein.

In some example embodiments, step S204 of sending the to-be-authenticated information to an authentication device in a reality scenario includes: sending the to-be-authenticated information, if an API interface matching a type of the to-be-authenticated information is found, to the authentication device through the API interface in the virtual reality scenario. In some example embodiments, an instant messaging application may also be used for sending the to-be-authenticated information to the authentication device, or communications technologies such as Bluetooth, infrared or a network may be used for sending the to-be-authenticated information to the authentication device. For example, a client B of the instant messaging application using an account A for login runs in the virtual reality scenario, and the account A may use the client B of the instant messaging application and a server C of the instant messaging application for sending the to-be-authenticated information to a client E of the instant messaging application using an account D for login in the authentication device.

It should be noted that, in this example embodiment, sending the to-be-authenticated information to the authentication device through the API interface if the API interface matching the type of the to-be-authenticated information is found, may be omitted in some example embodiments, and searching for an account matching the type of the to-be-authenticated information, of the instant messaging application may further be included. The to-be-authenticated information is sent to the authentication device if the account matching the type of the to-be-authenticated information is found. For example, the account is a chat application account. The to-be-authenticated information may further be sent to the authentication device in a wireless network. Any method that the to-be-authenticated information may be sent to the authentication device in the virtual reality scenario falls within a scope of this example embodiment. No example is illustrated herein.

Step S206: Receive an authentication result sent by the authentication device in the virtual reality scenario.

In the technical solution provided in the foregoing step S206 of this application, the authentication device performs authentication on the to-be-authenticated information after the to-be-authenticated information is sent to the authentication device in the reality scenario, to obtain the authentication result, and the authentication result may be used for indicating a result that the to-be-authenticated information is authenticated successfully, or may be used for indicating a result that the to-be-authenticated information fails to be authenticated. The authentication result is sent to a virtual scenario, and the authentication result sent by the authentication device is received in the virtual reality scenario after the authentication device performs authentication on the to-be-authenticated information to obtain the authentication result, thereby implementing an objective of information authentication based on the virtual reality scenario and simplifying an information authentication method in a virtual reality.

The foregoing step S202 through step S206 of obtaining to-be-authenticated information in the virtual reality scenario; sending the to-be-authenticated information to the authentication device in the reality scenario, the authentication device being used for performing authentication on the to-be-authenticated information; and receiving the authentication result sent by the authentication device in the virtual reality scenario, the authentication result being used for indicating that the to-be-authenticated information is authenticated successfully or fails to be authenticated, may resolve a technical problem that an information authentication method in a virtual reality in related technologies is complex. Accordingly, a technical effect of simplifying the information authentication method in the virtual reality may be achieved.

In some example embodiments, step S202 of obtaining to-be-authenticated information in the virtual reality scenario includes: an image displayed in the virtual reality scenario being obtained by scanning in the virtual reality scenario and the image being decoded to obtain the to-be-authenticated information.

Figure 4:
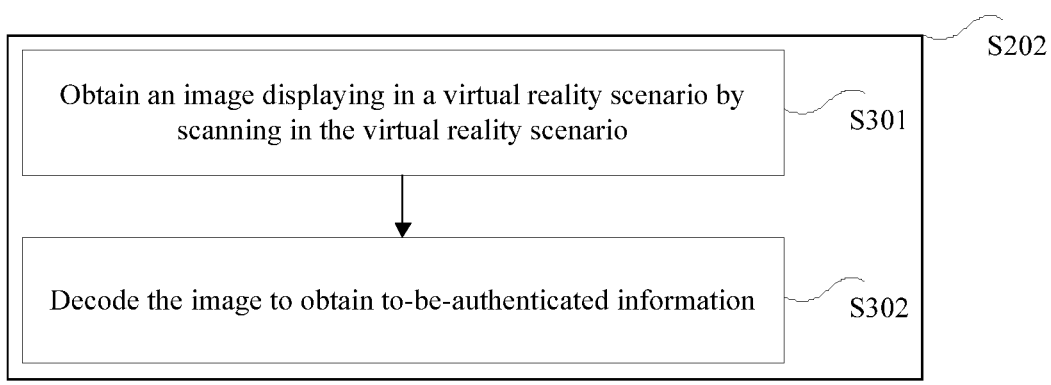
FIG. 4 is a flowchart of a method for obtaining to-be-authenticated information in a virtual reality scenario according to an example embodiment of this application.

FIG. 4 is a flowchart of a method for obtaining to-be-authenticated information in a virtual reality scenario according to an example embodiment of this application. As shown in FIG. 4, the method for obtaining the to-be-authenticated information in the virtual reality scenario may include the following steps:

Step S301: Obtain an image displayed in the virtual reality scenario by scanning in the virtual reality scenario.

In the technical solution provided in the foregoing step S301 according to this application, the image displayed in the virtual reality scenario may be obtained by scanning the image and capturing the image, the image being obtained by encoding the to-be-authenticated information.

The to-be-authenticated information may be displayed in a form of an image. The to-be-authenticated information is encoded in a virtual scenario to obtain the image, and the image is authentication information from encoding in accordance with a preset rule, such as a barcode. The encoded image is scanned when the virtual reality scenario displays the image, to obtain the image.

In some example embodiments, a program used for scanning the image is activated on a virtual terminal in the virtual reality scenario or a controller (such as a control handle) on a virtual reality device, the virtual terminal may be, but is not limited to, a virtual mobile phone, and the program for scanning the image may be stored on the virtual reality device (such as a VR device). The program for scanning the image is used for scanning the image to obtain the to-be-authenticated information representing in the image in a virtual scenario, where the program for scanning the image may be provided by a virtual reality system. In some example embodiments, a button on the controller is touched and controlled or a predetermined gesture is performed by using the controller to activate the program for scanning the image.

In view of an example, a program for scanning a payment image is activated on a virtual mobile phone in a virtual reality scenario when a payment scenario appears in the virtual reality scenario, and to-be-authenticated information in the virtual reality scenario is obtained by scanning the image by using the program for scanning the image.

Step S302: Decode the image to obtain the to-be-authenticated information.

In the technical solution provided in the foregoing step S302 of this application, the image is decoded to obtain the to-be-authenticated information after the image displayed in the virtual reality scenario is scanned and obtained in the virtual reality scenario. The decoding of the image corresponds to the encoding of the image. In some example embodiments, the image is decoded in accordance with a decoding rule corresponding to a preset rule when the image is encoded in accordance with the preset rule, to obtain authentication information.

This example embodiment of scanning in the virtual reality scenario to obtain the image displayed in the virtual reality scenario, the image being obtained by encoding the to-be-authenticated information; and decoding the image to obtain the to-be-authenticated information, the encoding corresponding to the decoding, implements an objective of obtaining the to-be-authenticated information in the virtual reality scenario.

In some example embodiments, the decoding for the image includes: decoding the image in the virtual reality scenario, and step S204 of sending the to-be-authenticated information to an authentication device in a reality scenario includes: sending the to-be-authenticated information to the authentication device through the API interface in the virtual reality scenario if the API interface matching the type of the to-be-authenticated information is found.

Figure 5:
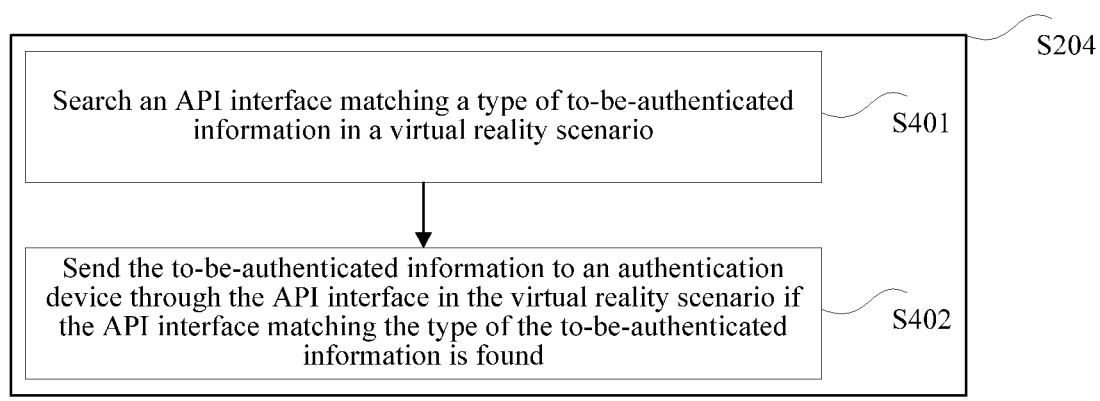
FIG. 5 is a flowchart of a method for sending to-be-authenticated information to an authentication device in a reality scenario according to an example embodiment of this application.

FIG. 5 is a flowchart of a method for sending to-be-authenticated information to an authentication device in a reality scenario according to an example embodiment of this application. As shown in FIG. 5, the method of sending the to-be-authenticated information to the authentication device in the reality scenario includes the following steps:

Step S401: Search an API interface matching a type of the to-be-authenticated information in a virtual reality scenario.

In the technical solution provided in the foregoing step S401 of this application, an application programming interface (Application Program Interface, API for short) matching the type of the to-be-authenticated information is searched in the virtual reality scenario. The decoding for an image includes decoding the image in the virtual reality scenario to obtain the to-be-authenticated information. In some example embodiments, multiple APIs exist in the virtual reality scenario, and different APIs correspond to different types of the to-be-authenticated information. The type of the to-be-authenticated information may be determined after the to-be-authenticated information is obtained, and an API matching the type of the to-be-authenticated information is searched in the virtual reality scenario. The API is an invoke interface that an operating system leaves for an application, and the API is invoked by the application to make the operating system execute command of the application.

Step S402: Send the to-be-authenticated information to the authentication device through the API interface in the virtual reality scenario if the API interface matching the type of the to-be-authenticated information is found.

In the technical solution provided in the foregoing step S402 of this application, the to-be-authenticated information is sent to the authentication device in the reality scenario and is sent through the API interface in the virtual reality scenario, if the API interface matching the type of the to-be-authenticated information is found.

This example embodiment of decoding an image in the virtual reality scenario, and searching the API interface matching the type of the to-be-authenticated information in the virtual reality scenario; and sending the to-be-authenticated information to the authentication device through the API interface in the virtual reality scenario if the API interface matching the type of the to-be-authenticated information is found, implements an objective of sending the to-be-authenticated information to the authentication device in the reality scenario.

In some example embodiments, an image displayed in the virtual reality scenario may be sent to a terminal, the terminal being used for decoding the image, to obtain the to-be-authenticated information, the encoding corresponding to the decoding; and sending the to-be-authenticated information to the authentication device in the reality scenario includes: searching the API interface matching the type of the to-be-authenticated information by the terminal, and sending the to-be-authenticated information to the authentication device through the API interface if the API interface matching the type of the to-be-authenticated information is found.

The terminal may decode the image to obtain the to-be-authenticated information. It may be implemented herein by sending the image displayed in the virtual reality scenario to the terminal, and decoding the image by the terminal, the terminal not being limited to a smartphone, a tablet computer or the like. The image is decoded in accordance with a decoding rule corresponding to a preset rule when the image is encoded in accordance with the preset rule, to obtain authentication information. The terminal searches the API interface matching the type of the to-be-authenticated information after the image is sent to the terminal, and the terminal sends the to-be-authenticated information to the authentication device through the API interface if the API interface matching the type of the to-be-authenticated information is found. In some example embodiments, the terminal and the terminal device of this example embodiment may be the same, or may both be the virtual reality device.

In some example embodiments, step S202 of obtaining to-be-authenticated information in the virtual reality scenario includes: the image displayed in the virtual reality scenario being obtained by the terminal in the reality scenario and the image being decoded to obtain the to-be-authenticated information.

Figure 6:
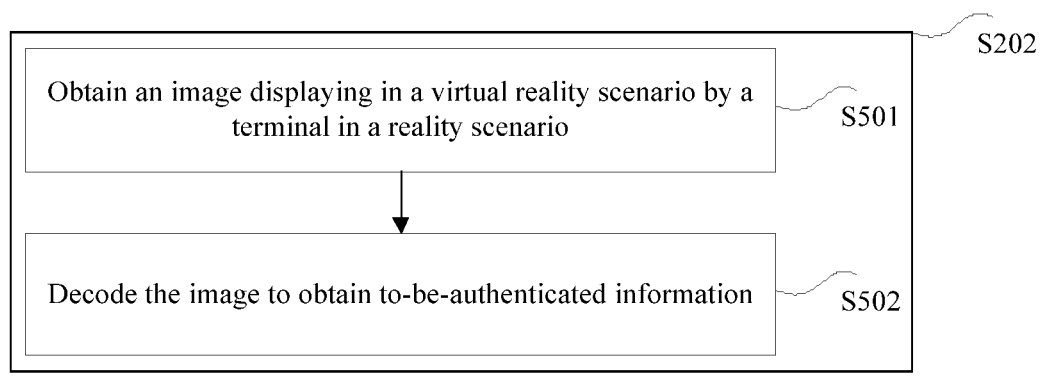
FIG. 6 is a flowchart of another method for obtaining to-be-authenticated information based on a virtual reality scenario according to an example embodiment of this application.

FIG. 6 is a flowchart of another method for obtaining to-be-authenticated information based on a virtual reality scenario according to an example embodiment of this application. As shown in FIG. 6, the method for obtaining the to-be-authenticated information in the virtual reality scenario may include the following steps:

Step S501: Obtain an image displayed in the virtual reality scenario by a terminal in a reality scenario.

In the technical solution provided in the foregoing step S501 of this application, the image displayed in the virtual reality scenario is obtained by the terminal in the reality scenario, the image being obtained by encoding the to-be-authenticated information.

A terminal exists in the reality scenario, and the terminal may be, for example, a smartphone, a tablet computer or the like. The terminal receives an image displayed in the virtual reality scenario that is sent through a corresponding API interface or by an instant messaging application or a wireless network. For example, the terminal receives the image displayed in a virtual scenario that is sent by Bluetooth, and the image is obtained by encoding the to-be-authenticated information. In some example embodiments, the foregoing instant messaging application may be, but is not limited to, a chat application or the like, and the wireless network may be, but is not limited to, a WIFI network or the like. This is not limited herein.

Step S502: Decode the image to obtain the to-be-authenticated information.

In the technical solution provided in the foregoing step S502 of this application, the image is decoded after the image displayed in the virtual reality scenario is obtained by the terminal in the reality scenario to obtain the to-be-authenticated information, wherein the encoding corresponds to the decoding. The image is decoded in accordance with a decoding rule corresponding to a preset rule when the to-be-authenticated information is encoded in accordance with the preset rule to obtain the to-be-authenticated information.

In some example embodiments, step S204 of sending the to-be-authenticated information to an authentication device in a reality scenario includes: sending the to-be-authenticated information to the authentication device by the terminal, wherein the terminal may send the to-be-authenticated information to the authentication device under a third-generation mobile communications technology (3rd-Generation, 3G for short), a fourth-generation mobile communications technology (4th-Generation, 4G for short), or a fifth-generation mobile communications technology (5th-Generation, 5G for short) after the image is decoded to obtain the to-be-authenticated information, and the authentication device may be an application, such as an instant messaging application.

This example embodiment of obtaining the image displayed in the virtual reality scenario by the terminal in the reality scenario, the image being obtained by encoding the to-be-authenticated information; decoding the image, to obtain the to-be-authenticated information, the encoding corresponding to the decoding, and sending the to-be-authenticated information to the authentication device by the terminal, achieves a technical effect of simplifying an information authentication method in a virtual reality.

In some example embodiments, step S204 of sending the to-be-authenticated information to an authentication device by a terminal includes: sending the to-be-authenticated information, if an API interface matching a type of the to-be-authenticated information is found, to the authentication device through the API interface.

Figure 7:
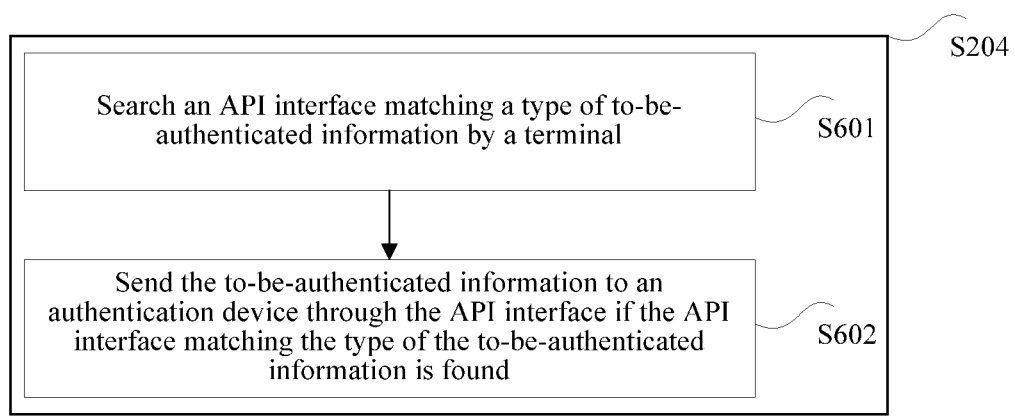
FIG. 7 is a flowchart of a method for sending to-be-authenticated information to an authentication device by a terminal according to an example embodiment of this application.

FIG. 7 is a flowchart of a method for sending to-be-authenticated information to an authentication device by a terminal according to an example embodiment of this application. As shown in FIG. 7, the method of sending the to-be-authenticated information to the authentication device by the terminal includes the following steps:

Step S601: Search an API interface matching a type of the to-be-authenticated information by the terminal.

In the technical solution provided in the foregoing step S601 of this application, an API interface matching the type of the to-be-authenticated information is searched by a terminal after the to-be-authenticated information is obtained in a virtual reality scenario. In other words, the API interface matching the type of the to-be-authenticated information is identified from multiple API interfaces by the terminal. The terminal may be a smartphone, a tablet computer or the like. The terminal is installed with an application, and may be used for an authentication service.

Step S602: Send the to-be-authenticated information to the authentication device through the API interface if the API interface matching the type of the to-be-authenticated information is found.

In the technical solution provided in the foregoing step S602 of this application, the to-be-authenticated information is sent to the authentication device through the API interface if the API interface matching the type of the to-be-authenticated information is found. In some example embodiments, the to-be-authenticated information is sent to the authentication device through the API interface under 3G, 4G, or 5G network, and the authentication device may be an application, such as an instant messaging application or the like.

This example embodiment of searching the API interface matching the type of the to-be-authenticated information by the terminal; and sending the to-be-authenticated information to the authentication device through the API interface if the API interface matching the type of the to-be-authenticated information is found implements an objective of sending the to-be-authenticated information to the authentication device by the terminal.

In some example embodiments, the image includes: an image displayed a two-dimensional barcode, the image of the two-dimensional barcode being an image obtained from encoding the to-be-authenticated information, and the to-be-authenticated information in the virtual reality scenario may be obtained by scanning the image of the two-dimensional barcode so that the two-dimensional barcode image is decoded to obtain the to-be-authenticated information, and the encoding rule for encoding the to-be-authenticated information corresponds to the decoding rule for decoding the two-dimensional barcode image.

In some example embodiments, the image is an image of a two-dimensional barcode (QR code). The QR code is a quadrate and only includes two colors: black and white. Three of four corners of the QR code may have a relatively small and hollow square shaped pattern. The three patterns are used for helping decoding software in locating. A user need not align the patterns and data may be read correctly no matter the angle being used for scanning. The QR code may store much more data than a common barcode, and may be scanned successfully without aligning a scanner straightly like the common barcode when being scanned.

The foregoing example embodiment of this application of sending the to-be-authenticated information to an authentication device in a reality scenario, the authentication device being used for performing authentication on the to-be-authenticated information; and receiving an authentication result sent by the authentication device in a virtual reality scenario, the authentication result being used for indicating the to-be-authenticated information is authenticated successfully or fails to be authenticated, and performing authentication on the to-be-authenticated information by the authentication device in the reality scenario, receives the authentication result sent by the authentication device in the virtual reality scenario instead of re-establishing an information authentication method in the virtual reality scenario to achieve an objective of performing authentication on the to-be-authenticated information on a virtual scenario and avoid that performing authentication on information in a virtual reality needs the information authentication method to be re-established in the virtual reality scenario. Accordingly, a technical effect of simplifying the information authentication method in the virtual reality is achieve, and a technical problem that the information authentication method in the virtual reality is complex in related technologies is resolved.

The following with reference to some example embodiments illustrates a technical solution of this application.

The to-be-authenticated information in a virtual reality scenario is obtained from decoding an image in the virtual reality scenario, and an API interface matching a type of the to-be-authenticated information in the virtual reality scenario is searched; and the to-be-authenticated information is sent to the authentication device in the virtual reality scenario through the API interface to send the to-be-authenticated information to an authentication device in a reality scenario if the API interface matching the type of the to-be-authenticated information is found.

Figure 8:
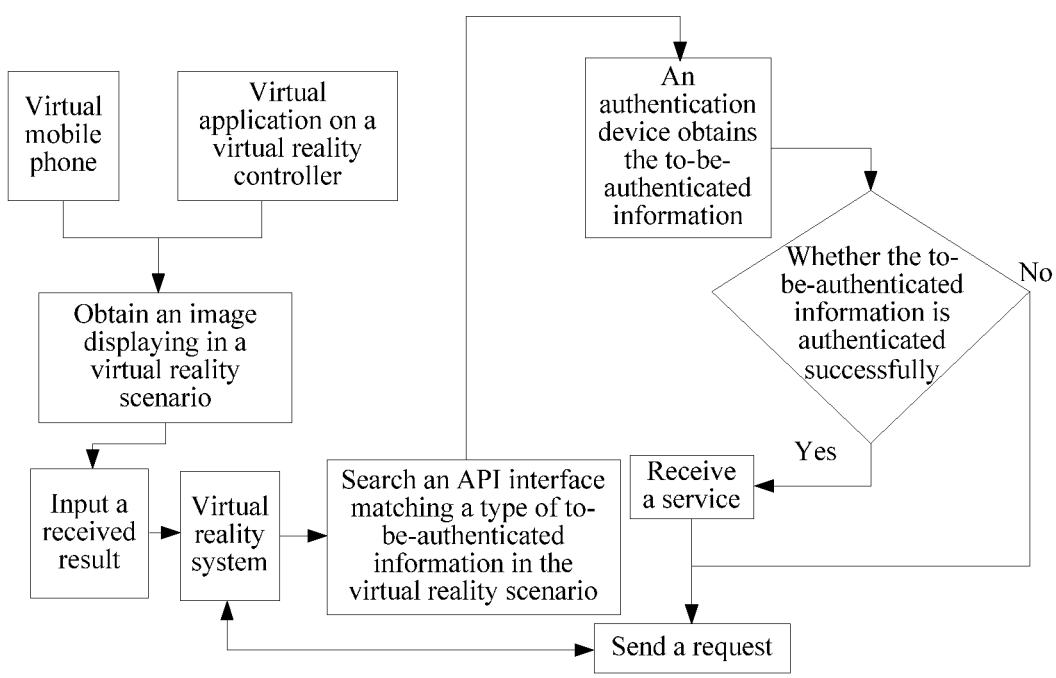
FIG. 8 is a schematic diagram of a process of another information authentication method based on a virtual reality scenario according to an example embodiment of this application.

FIG. 8 is a schematic diagram of a process of another information authentication method based on a virtual reality scenario according to an example embodiment of this application. As shown in FIG. 8, the example embodiment is a combination of the virtual reality scenario and the reality scenario. The executing method in the virtual reality scenario includes: the image (Capture Virtual image) displaying in the virtual reality scenario may be obtained, an input result (input received) may be received, a virtual reality system (VR System) may be executed, and an API (Identify the right 3rd party API) interface matching a type of the to-be-authenticated information in the virtual reality scenario is searched, by a controller (Virtual App on VR controller, such as a control handle) on a virtual reality device and/or a virtual device (such as a virtual mobile phone (Virtual Phone)) in a virtual scenario; the executing method in the reality scenario includes: the authentication device obtains the to-be-authenticated information (3rd party Authentication Service), determines whether the to-be-authenticated information is authenticated successfully (Code match), and receives a service (Authenticated! Give access to service) and sends a request (such as a payee or payment request) when the to-be-authenticated information is authenticated successfully if it is determined that the to-be-authenticated information is authenticated successfully; the authentication device sends a request allowed to be sent when the to-be-authenticated information fails to be authenticated if it is determined that the to-be-authenticated information fails to be authenticated, and the virtual reality system may receive a sending request, or may output the sending request.

In some example embodiments, the controller (such as a control handle) on a virtual reality device and a virtual device in a virtual scenario collectively or independently activate a program for scanning the image, to obtain the image displayed in the virtual reality scenario, and the controller may be hardware on the virtual reality device, such as a control handle of a VR device. In some example embodiments, a button on the controller may be touched and controlled to activate the program for scanning the image to run, or a predetermined gesture is performed by a controller to activate the program for scanning the image to run. In some example embodiments, the image displayed in the virtual reality scenario is obtained by scanning in the virtual reality scenario, and the image is obtained by encoding the to-be-authenticated information. An input result is received after the image displayed in the virtual reality scenario is obtained, the input result is inputted to a virtual reality system, and a request is sent by the virtual reality system. In some example embodiments, the sent request may be a payment or payee request in a virtual reality. An API interface matching a type of the to-be-authenticated information in the virtual reality scenario is searched after the input result is inputted to the virtual reality system, and the to-be-authenticated information is sent to an authentication device through the API interface if the API interface matching the type of the to-be-authenticated information is found. In some example embodiments, a personal identification number (Personal Identification Number, PIN for short) is inputted if requested. The authentication device obtains the to-be-authenticated information, determines whether the to-be-authenticated information is authenticated successfully, and receives a service and sends a request if it is determined that the to-be-authenticated information is authenticated successfully. In some example embodiments, the request corresponds to information of a two-dimensional barcode image. The authentication device sends a request if it is determined that the to-be-authenticated information fails to be authenticated to achieve an objective of performing authentication on the to-be-authenticated information in a virtual scenario so as to implement a technical effect of simplifying an information authentication method in a virtual reality.

This example embodiment of decoding the image in the virtual reality scenario, to obtain the to-be-authenticated information; searching for an API interface matching a type of the to-be-authenticated information in the virtual reality scenario; sending the to-be-authenticated information to the authentication device in the virtual reality scenario through the API interface, if the API interface matching the type of the to-be-authenticated information is found, and receiving an authentication result sent by the authentication device in the virtual reality scenario, achieves an objective of performing authentication on the to-be-authenticated information in a virtual scenario, to avoid that performing authentication on information in a virtual reality needs to re-establish an information authentication method in the virtual reality scenario, so as to implement a technical effect of simplifying an information authentication method in the virtual reality.

In another example, an image displayed in a virtual reality scenario may be sent to a terminal, the terminal being used for decoding the image to obtain the to-be-authenticated information, and the encoding corresponding to the decoding. An API interface matching a type of the to-be-authenticated information is searched by the terminal, and the to-be-authenticated information is sent to the authentication device through the API interface to send the to-be-authenticated information to the authentication device in a reality scenario if the API interface matching the type of the to-be-authenticated information is found.

Figure 9:
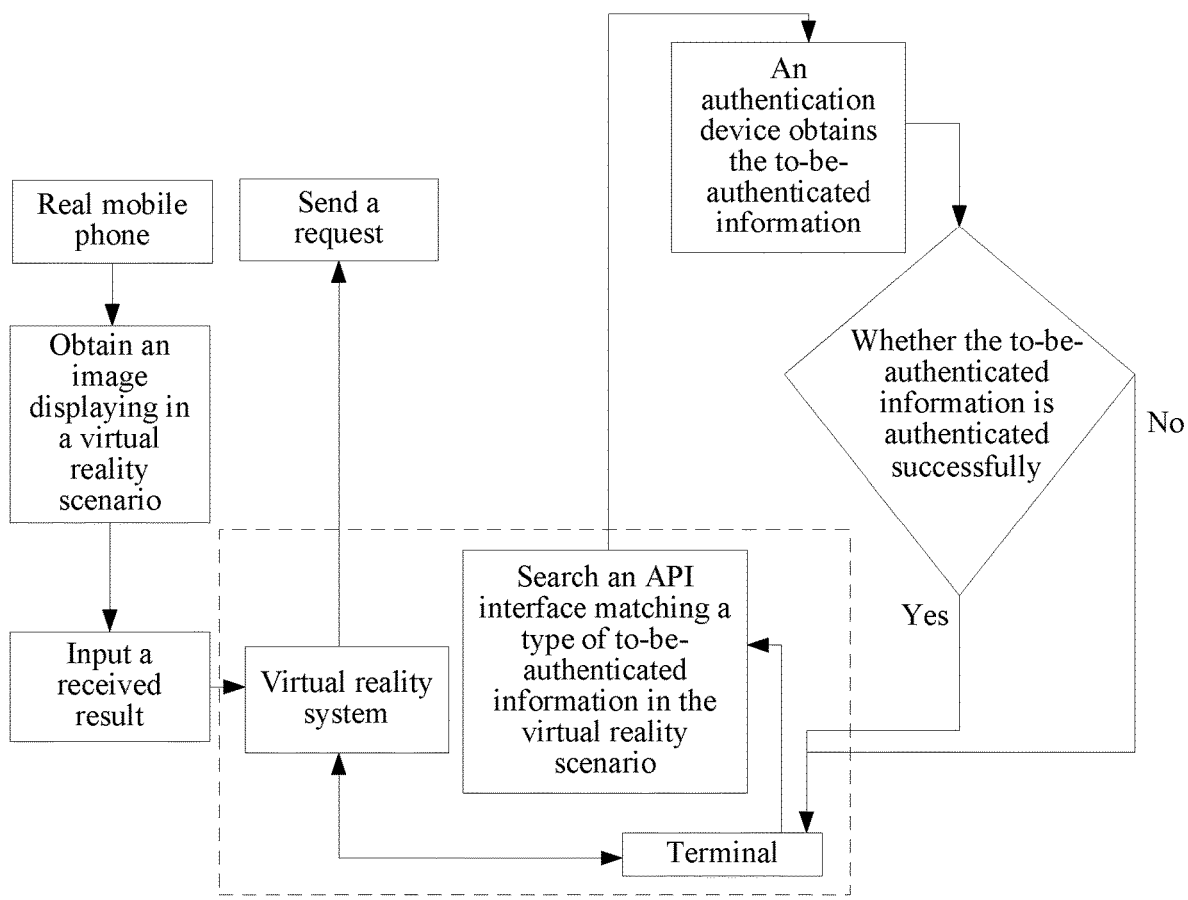
FIG. 9 is a schematic diagram of a process of another information authentication method based on a virtual reality scenario according to an example embodiment of this application.

FIG. 9 is a schematic diagram of a process of another information authentication method based on a virtual reality scenario according to an example embodiment of this application. As shown in FIG. 9, this example embodiment is a combination of an external monitor (External Monitor) and a reality scenario (Real World System). Hardware to which the external monitor relates includes: a terminal in the reality scenario, and the terminal may include but is not limited to: a smartphone, a tablet computer or the like. This is not limited herein. In an external monitor process, an image (Capture Virtual image) displaying a virtual reality scenario is obtained, a received result (input received) is inputted, a virtual reality system (VR System) is executed, or a request (Offer or Payment request, such as a payee or payment request) is sent; and the reality scenario includes: an API interface matching a type of to-be-authenticated information is searched by the terminal, an authentication device obtains the to-be-authenticated information (3rd party Authentication Service) and determines whether the to-be-authenticated information is authenticated successfully (Code match), to obtain an authentication result, the authentication result is inputted to the terminal, and the terminal may perform interaction with the virtual reality system.

In some example embodiments, the image displayed in the virtual reality scenario may be received by the terminal, and the terminal is installed with an application and provides an authentication service. In some example embodiments, the image displayed in the virtual reality scenario is obtained by scanning in the virtual reality scenario, and the image is obtained by encoding the to-be-authenticated information and may be a two-dimensional barcode (QR code). An input result is received after the image displayed in the virtual reality scenario is obtained, the input result is inputted to a virtual reality system, and a request is sent by the virtual reality system. In some example embodiments, the sent request may be a payment or payee request in a virtual reality. The image in the virtual reality scenario may be decoded by Bluetooth after the input result is inputted to the virtual reality system, to obtain the to-be-authenticated information, the to-be-authenticated information is sent to the terminal, and the terminal is inputted a PIN code when requested. An API interface matching a type of the to-be-authenticated information is searched by the terminal, if the API interface matching the type of the to-be-authenticated information is found, the to-be-authenticated information is sent to an authentication device through the API interface by 3G, 4G, or 5G, the authentication device obtains the to-be-authenticated information and determines whether the to-be-authenticated information is authenticated successfully, to obtain an authentication result, the authentication result is inputted to the terminal, and a virtual system may receive an appropriate response and display a related interface or information. The authentication result sent by the authentication device is received in the virtual reality scenario to achieve an objective of performing authentication on the to-be-authenticated information in a virtual scenario, and avoid that performing authentication on information in a virtual reality needs to re-establish an information authentication method in the virtual reality scenario, so as to implement a technical effect of simplifying an information authentication method in the virtual reality.

This example embodiment of sending an image displayed in a virtual reality scenario to a terminal, the terminal being used for decoding the image to obtain the to-be-authenticated information, and the encoding corresponding to the decoding; searching for an API interface matching a type of the to-be-authenticated information by the terminal, and sending the to-be-authenticated information to the authentication device through the API interface if the API interface matching the type of the to-be-authenticated information is found, achieves an objective of performing authentication on the to-be-authenticated information in a virtual scenario, thereby implementing a technical effect of simplifying an information authentication method in the virtual reality.

An image displayed in a virtual reality scenario is obtained by a terminal in a reality scenario, and the image is obtained by encoding to-be-authenticated information; the image is decoded to obtain the to-be-authenticated information so as to obtain the to-be-authenticated information in the virtual reality scenario, and the encoding corresponds to the decoding; an API interface matching a type of the to-be-authenticated information is searched by the terminal; the to-be-authenticated information is sent to an authentication device through the API interface, to send the to-be-authenticated information to an authentication device in the reality scenario if the API interface matching the type of the to-be-authenticated information is found. An authentication result sent by the authentication device is received in the virtual reality scenario, to avoid that performing authentication on information in a virtual reality needs an information authentication method to be re-established in a virtual reality scenario, and achieve an objective of performing authentication on the to-be-authenticated information in a virtual scenario to implement a technical effect of simplifying an information authentication method in the virtual reality.

Figure 10:
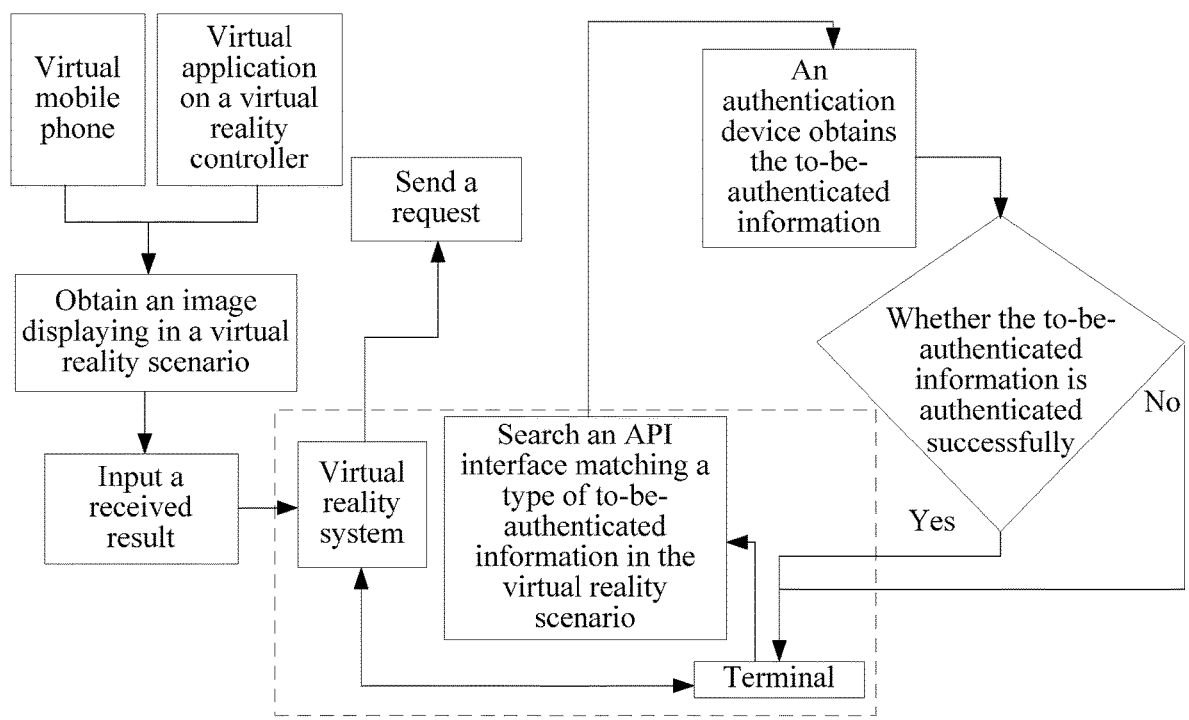
FIG. 10 is a schematic diagram of a process of another information authentication method based on a virtual reality scenario according to an example embodiment of this application.

FIG. 10 is a flowchart of another information authentication method based on a virtual reality scenario according to an example embodiment of this application. As shown in FIG. 10, the example embodiment is a combination of the virtual reality scenario (VR System) and the reality scenario (Real World System). A controller (such as a control handle) on a virtual reality device and a virtual device in a virtual scenario collectively or independently activate a program for scanning an image, to obtain the image displayed in the virtual reality scenario, input a received result (input received), execute a virtual reality system (VR System), or send a request (Offer or Payment request, such as a payee or payment request); and the reality scenario includes: an API interface matching a type of to-be-authenticated information is searched by a terminal; an authentication device obtains the to-be-authenticated information (3rd party Authentication Service) and determines whether the to-be-authenticated information is authenticated successfully (Code match) to obtain an authentication result, the authentication result is inputted to the terminal, and the terminal may perform interaction with the virtual reality system.

A controller (such as a control handle) on a virtual reality device and a virtual device in a virtual scenario collectively or independently activate a program for scanning an image, to obtain the image displayed in the virtual reality scenario. In some example embodiments, the image displayed in the virtual reality scenario is obtained by scanning in the virtual reality scenario, and the image is obtained by encoding the to-be-authenticated information and may be a two-dimensional barcode (QR code). An input result is received after the image displayed in the virtual reality scenario is obtained, the input result is inputted to a virtual reality system, and a request is sent by the virtual reality system. In some example embodiments, the sent request may be a payment or payee request in a virtual reality. The image in the virtual reality scenario is decoded by Bluetooth after the input result is inputted to the virtual reality system, to obtain the to-be-authenticated information, the to-be-authenticated information is sent to the terminal, and the terminal is inputted a PIN code when being requested. An API interface matching a type of the to-be-authenticated information is searched by the terminal, if the API interface matching the type of the to-be-authenticated information is found, the to-be-authenticated information is sent to an authentication device through the API interface by 3G, 4G, or 5G, the authentication device obtains the to-be-authenticated information and determines whether the to-be-authenticated information is authenticated successfully, to obtain an authentication result, the authentication result is inputted to the terminal, and a virtual system may receive an appropriate response and display a related interface or information to achieve an objective of performing authentication on the to-be-authenticated information in a virtual scenario, so as to implement a technical effect of simplifying an information authentication method in the virtual reality.

This example embodiment of obtaining the image displayed in the virtual reality scenario by the terminal in the reality scenario, the image being obtained by encoding the to-be-authenticated information; decoding the image, to obtain the to-be-authenticated information, the encoding corresponding to the decoding; sending the to-be-authenticated information to the authentication device by the terminal, and searching for an API interface matching the type of the to-be-authenticated information; sending the to-be-authenticated information to an authentication device through the API interface if the API interface matching the type of the to-be-authenticated information is found. An authentication result sent by the authentication device is received in the virtual reality scenario to avoid that performing authentication on information in a virtual reality needs an information authentication method to be re-established in the virtual reality scenario, and achieve an objective of performing authentication on the to-be-authenticated information in a virtual scenario, thereby implementing a technical effect of simplifying an information authentication method in the virtual reality.

An application environment of this example embodiment of this application may refer but is not limited to the application environment of the foregoing example embodiment, and details are not described in this example embodiment again. This example embodiment of this application provides a specific application for implementing the information authentication method based on the virtual reality scenario that may be omitted in some example embodiments.

Figure 11:
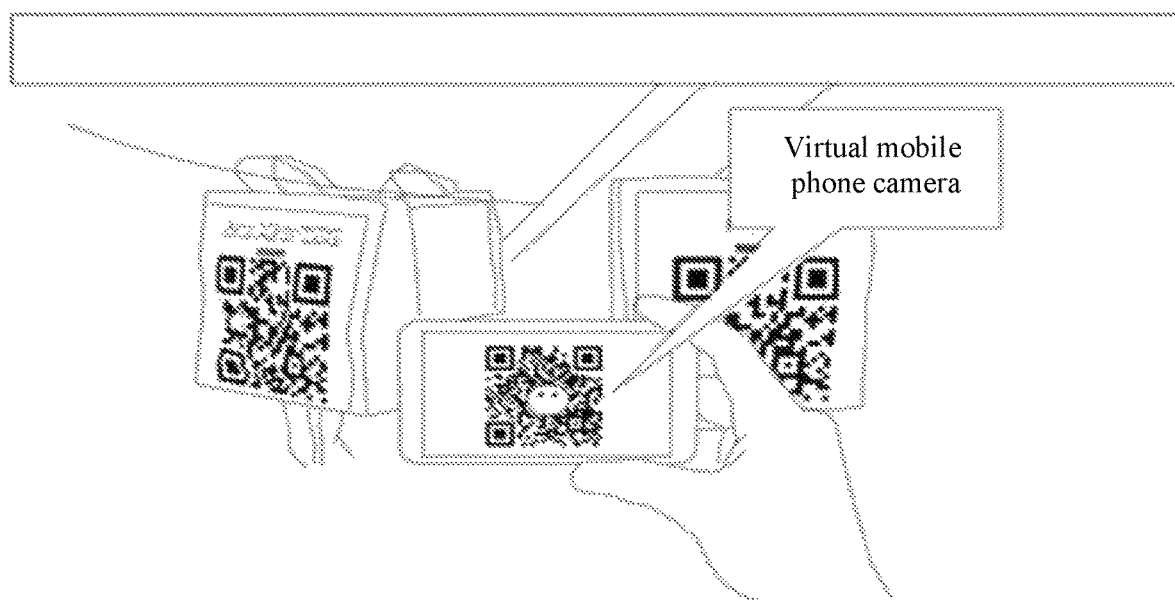
FIG. 11 is a schematic diagram of an information authentication scenario based on a virtual reality scenario according to an example embodiment of this application.

FIG. 11 is a schematic diagram of an information authentication scenario based on a virtual reality scenario according to an example embodiment of this application. As shown in FIG. 11, in the virtual reality scenario, users may perform authentication on their information or perform authentication on any service information by using a two-dimensional barcode (QR code) by a virtual mobile phone camera.

Figure 12:
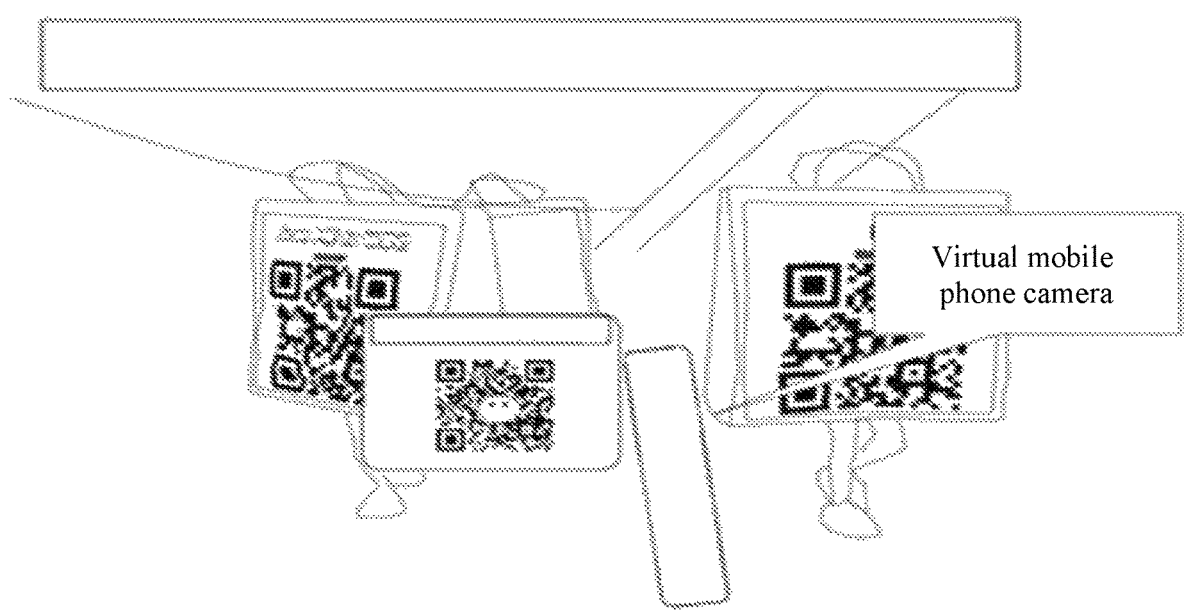
FIG. 12 is a schematic diagram of another information authentication scenario based on a virtual reality scenario according to an example embodiment of this application.

FIG. 12 is a schematic diagram of another information authentication scenario based on a virtual reality scenario according to an example embodiment of this application. As shown in FIG. 12, users may select a scan mode of a controller when using a virtual mobile phone camera to perform authentication on their information by scanning a two-dimensional barcode (QR code).

Some example embodiments of this application provide an information authentication method in a reality scenario and a virtual reality scenario, and an enterprise need not spend a resource to re-establish a new authentication method, thereby implementing a technical effect of simplifying an information authentication method in a virtual reality and further extending a service in the virtual reality.

It should be noted that, to simplify the description, the foregoing method example embodiments are described as a series of actions, but persons of ordinary skill in the art should know that this application is not limited to any described sequence of the actions, as some steps may adopt other sequences or may be performed simultaneously according to this application. Also, persons skilled in the art should know that the example embodiments described in the specification are not limiting and the involved actions and modules may be excluded in some example embodiments.

Through the foregoing description of the implementation manners, it is clear to persons skilled in the art that the method of the foregoing example embodiments may be implemented by software plus a universal hardware platform, and may also be implemented by hardware. Based on such an understanding, the technical solutions of this application or the part that makes contributions to related art technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to example embodiments of this application.

Figure 13:
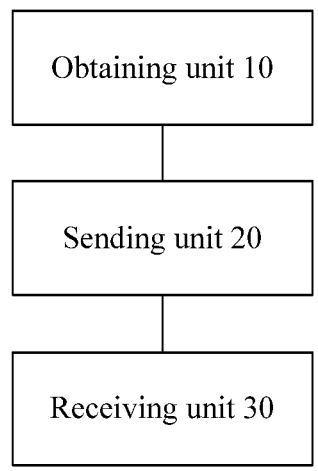
FIG. 13 is a schematic diagram of an information authentication apparatus based on a virtual reality scenario according to an example embodiment of this application.

According to an example embodiment of this application, an information authentication apparatus based on a virtual reality scenario used for implementing an information authentication method based on the virtual reality scenario is further provided. FIG. 13 is a schematic diagram of an information authentication apparatus based on a virtual reality scenario according to an example embodiment of this application. As shown in FIG. 13, the apparatus may include: an obtaining unit 10, a sending unit 20 and a receiving unit 30.

The obtaining unit 10 is configured to obtain to-be-authenticated information in the virtual reality scenario.

A virtual reality technology is a computer emulation system on which a virtual world may be established and experienced, the computer emulation system may use a computer to generate a staging environment, aspects of which includes: simulating an environment, awareness, a natural skill and a sensing device, and is multi-source information gathering and interactive emulation of a three-dimensional dynamic viewing and an entity behavior to make a user immerse in the environment. The virtual reality scenario has to-be-authenticated information, and the to-be-authenticated information may be information of authentication to be performed on the user in the virtual reality scenario, or information of authentication to be performed on a service in the virtual reality scenario. In some example embodiments, the virtual reality scenario has a virtual device, the obtaining unit 10 obtains the to-be-authenticated information of the virtual device in the virtual reality scenario, and the to-be-authenticated information may be represented by using an image.

In some example embodiments, a virtual terminal (such as a virtual mobile phone, a virtual camera or other terminals that may be used for photographing) in the virtual reality scenario or a controller on a virtual reality device may be used for activating a program for scanning the image, when the to-be-authenticated information is obtained. The program for scanning the image is used for scanning the image, to obtain the to-be-authenticated information representing in the image in a virtual scenario, where the program for scanning the image may run in an operational system (such as an operating system) of the virtual reality device. For example, a virtual mobile phone in a virtual reality scenario is used for activating a program for scanning a payment image when a payment scenario appears in the virtual reality scenario, and to-be-authenticated information in the virtual reality scenario is obtained by scanning the image by using the program for scanning the image.

The sending unit 20 is configured to send the to-be-authenticated information to an authentication device in a reality scenario, the authentication device being used for performing authentication on the to-be-authenticated information.

The sending unit 20 is configured to send the to-be-authenticated information to an authentication device in a reality scenario after the to-be-authenticated information in the virtual reality scenario is obtained, and the authentication device is used for performing authentication on the to-be-authenticated information and may be a device that an application used for performing an authentication service exists on. The application may be an instant messaging application.

A relationship among a terminal, a server and an authentication device of this example embodiment may be as the example embodiment shown in FIG. 3, and details are not described herein again.

In some example embodiments, the sending unit 20 is further configured to, if an API interface matching a type of the to-be-authenticated information is found: send the to-be-authenticated information to the authentication device in the virtual reality scenario through the API interface.

It should be noted that, in this example embodiment, the sending the to-be-authenticated information, if an API interface matching the type of the to-be-authenticated information is found, to the authentication device through the API interface may not be included, and searching an account of an instant messaging application and matching a type of the to-be-authenticated information may further be included. The to-be-authenticated information is sent to the authentication device if the account matching the type of the to-be-authenticated information is found. For example, the account is a chat application account. The to-be-authenticated information may further be sent to the authentication device in a wireless network. Any method of sending the to-be-authenticated information to the authentication device in the virtual reality scenario falls within the scope of this example embodiment of the present disclosure. No example is illustrated herein.

The receiving unit is configured to receive an authentication result sent by the authentication device in a virtual reality scenario, the authentication result being used for indicating that the to-be-authenticated information is authenticated successfully or fails to be authenticated.

The authentication device performs authentication on the to-be-authenticated information after the to-be-authenticated information is sent to the authentication device in a reality scenario to obtain the authentication result, and the authentication result may be used for indicating a result that the to-be-authenticated information is authenticated successfully, or may be used for indicating a result that the to-be-authenticated information fails to be authenticated. The authentication device sends the authentication result to a virtual scenario after performing authentication on the to-be-authenticated information and obtaining the authentication result to receive the authentication result sent by the authentication device by the receiving unit 30 in the virtual reality scenario, thereby implementing an objective of information authentication based on the virtual reality scenario and simplifying an information authentication method in a virtual reality.

In this example embodiment, the obtaining unit 10 obtains the to-be-authenticated information in the virtual reality scenario, the sending unit 20 sends the to-be-authenticated information to the authentication device in the reality scenario, where the authentication device is used for performing authentication on the to-be-authenticated information, and the receiving unit 30 receives the authentication result sent by the authentication device in the virtual reality scenario, where the authentication result is used for indicating that the to-be-authenticated information is authenticated successfully or fails to be authenticated. This application resolves a technical problem that an information authentication method in a virtual reality in related technologies is complex, thereby achieving a technical effect of simplifying the information authentication method in the virtual reality.

Figure 14:
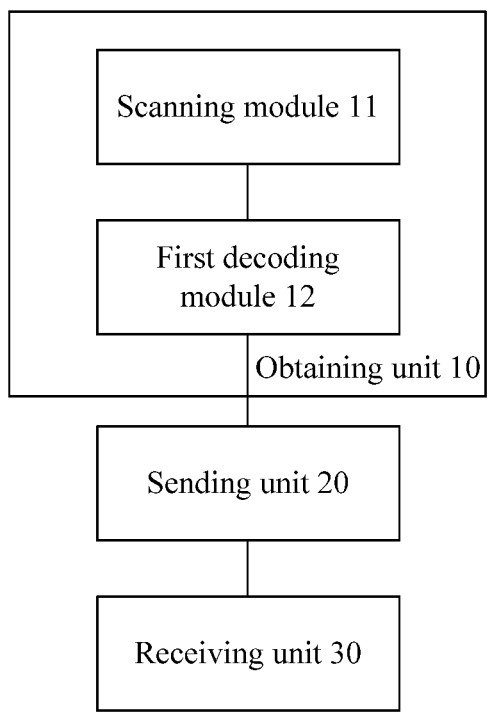
FIG. 14 is a schematic diagram of another information authentication apparatus based on a virtual reality scenario according to an example embodiment of this application.

FIG. 14 is a schematic diagram of another information authentication apparatus based on a virtual reality scenario according to an example embodiment of this application. As shown in FIG. 14, the information authentication apparatus based on the virtual reality scenario includes: an obtaining unit 10, a sending unit 20 and a receiving unit 30, where the obtaining unit 10 includes: a scanning module 11 and a first decoding module 12.

It should be noted that, functions of the obtaining unit 10, the sending unit 20 and the receiving unit 30 in this example embodiment are the same as functions of that of the information authentication apparatus based on the virtual reality scenario in the example embodiment shown in FIG. 13, and details are not described herein again.

A scanning module 11 is configured to, in the virtual reality scenario: scan an image displayed in the virtual reality scenario, the image being obtained by encoding the to-be-authenticated information.

Obtaining the image displayed in the virtual reality scenario may be implemented by using the scanning module 11 to scan the image and capture the image, the image being obtained by encoding the to-be-authenticated information.

The to-be-authenticated information may be displayed in a form of an image. The to-be-authenticated information is encoded in a virtual scenario to obtain the image, and the image is authentication information from encoding in accordance with a preset rule, such as a barcode. The encoded image is scanned by the scanning module 11 when the virtual reality scenario displays the image, to make the obtaining unit 10 obtain the image.

In some example embodiments, a program for scanning the image may be activated on a virtual mobile phone or a controller in the virtual reality scenario, the image is scanned by the program used for scanning the image to obtain to-be-authenticated information in a virtual scenario represented in the image, where the program used for scanning the image may run in an operational system (such as an operating system) on a virtual reality device.

In view of an example, a program for scanning a payment image is activated on a virtual mobile phone in a virtual reality scenario when a payment scenario appears in the virtual reality scenario, and to-be-authenticated information in the virtual reality scenario is obtained by scanning the image by using the program for scanning the image.

A first decoding module 12 is configured to decode the image, to obtain the to-be-authenticated information, the encoding corresponding to the decoding.

The image is decoded by the first decoding module 12, after the image displayed in the virtual reality scenario is scanned and obtained by the scanning module 11 in the virtual reality scenario, to obtain the to-be-authenticated information. The decoding of the image corresponds to the encoding of the image. In some example embodiments, the first decoding module 12 decodes the image in accordance with a decoding rule corresponding to a preset rule when the image is encoded in accordance with the preset rule, to obtain authentication information.

Figure 15:
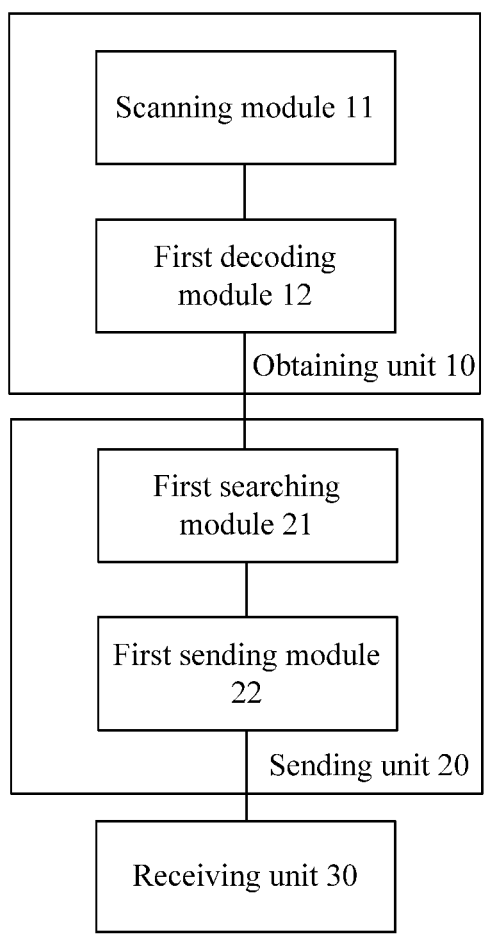
FIG. 15 is a schematic diagram of another information authentication apparatus based on a virtual reality scenario according to an example embodiment of this application.

FIG. 15 is a schematic diagram of another information authentication apparatus based on a virtual reality scenario according to an example embodiment of this application. As shown in FIG. 15, the information authentication apparatus based on the virtual reality scenario includes: an obtaining unit 10, a sending unit 20 and a receiving unit 30, where the obtaining unit 10 includes: a scanning module 11 and a first decoding module 12. The sending unit 20 includes: a first searching module 21 and a first sending module 22.

It should be noted that, functions of the obtaining unit 10, the sending unit 20, the receiving unit 30, the scanning module 11 and the first decoding module 12 in this example embodiment are the same as functions of that of the information authentication apparatus based on the virtual reality scenario in the example embodiment shown in FIG. 14, and details are not described herein again.

The first decoding module 12 is configured to decode an image in the virtual reality scenario to obtain the to-be-authenticated information.

The first searching module 21 is configured to search an application programming interface (API) matching a type of the to-be-authenticated information in the virtual reality scenario. In some example embodiments, multiple APIs exist in the virtual reality scenario, and different APIs correspond to different types of the to-be-authenticated information. The type of the to-be-authenticated information is determined after the to-be-authenticated information is obtained, and the first searching module 21 searches an API matching the type of the to-be-authenticated information in the virtual reality scenario. The API is an invoke interface that an operating system leaves for an application, and the API is invoked by an application to make the operating system execute a command of the application.

The first sending module 22 is configured to, if an API interface matching a type of the to-be-authenticated information is found: send the to-be-authenticated information to the authentication device in the virtual reality scenario through the API interface.

The first sending module 22 sends the to-be-authenticated information to the authentication device through the API interface in the virtual reality scenario when the first searching module 21 finds the API interface matching the type of the to-be-authenticated information.

In some example embodiments, the first decoding module 12 is configured to send the image to a terminal, the terminal being used for decoding the image to obtain the to-be-authenticated information, and the encoding corresponding to the decoding; the sending unit 20 is configured to: search the API interface matching the type of the to-be-authenticated information by the terminal, and send the to-be-authenticated information to the authentication device through the API interface, if the API interface matching the type of the to-be-authenticated information is found.

The terminal may decode the image, and the obtaining unit 10 obtaining the to-be-authenticated information may be implemented by sending the image to the terminal and decoding the image by the terminal, the terminal being not limited to a smartphone, a tablet computer or the like. The first decoding module 12 may decode the image in accordance with a decoding rule corresponding to a preset rule when the image is encoded in accordance with the preset rule, to obtain authentication information. An API interface matching a type of authentication information is searched by the terminal after the sending unit 20 sends the image to the terminal, and the terminal sends the to-be-authenticated information to the authentication device through the API interface if the API interface matching the type of the to-be-authenticated information is found. In some example embodiments, the terminal and the terminal device of this example embodiment may be the same, or may both be the virtual reality device.

Figure 16:
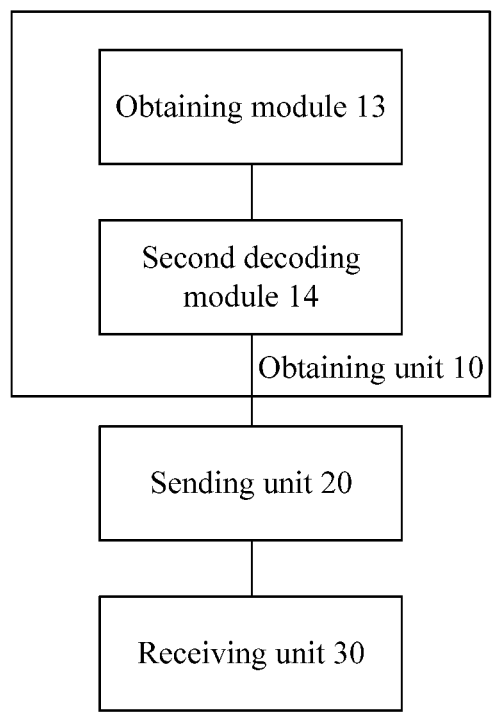
FIG. 16 is a schematic diagram of another information authentication apparatus based on a virtual reality scenario according to an example embodiment of this application.

FIG. 16 is a schematic diagram of another information authentication apparatus based on a virtual reality scenario according to an example embodiment of this application. As shown in FIG. 16, the information authentication apparatus based on the virtual reality scenario includes: an obtaining unit 10, a sending unit 20 and a receiving unit 30, where the obtaining unit 10 includes: an obtaining module 13 and a second decoding module 14.

It should be noted that, functions of the obtaining unit 10, the sending unit 20 and the receiving unit 30 of this example embodiment are the same as functions of that in the information authentication apparatus based on the virtual reality scenario in the example embodiment shown in FIG. 13, and details are not described herein again.

The obtaining module 13 is configured to obtain an image displayed in the virtual reality scenario with a terminal in a reality scenario, the image being obtained by encoding the to-be-authenticated information.

A terminal exists in the reality scenario, and the terminal may be a smartphone, a tablet computer and the like. The terminal receives an image displayed in the virtual reality scenario and sent through a corresponding API interface or by an instant messaging application or a wireless network. For example, the terminal receives the image displayed in a virtual scenario sent by Bluetooth, and the image is obtained by encoding the to-be-authenticated information. The instant messaging application may be a chat application and the like, and the wireless network may be a WIFI network. This is not limited herein.

A second decoding module 14 is configured to decode the image, to obtain the to-be-authenticated information, the encoding corresponding to the decoding.

The image is decoded by the second decoding module 14 after the obtaining module 13 obtains the image displayed in the virtual reality scenario by the terminal in the reality scenario, to obtain the to-be-authenticated information, where the encoding corresponds to the decoding. The second decoding module 14 decodes the image in accordance with a decoding rule corresponding to a preset rule when the to-be-authenticated information is encoded in accordance with the preset rule to obtain the to-be-authenticated information.

In some example embodiments, the sending unit 20 is configured to send the to-be-authenticated information to the authentication device by the terminal.

Figure 17:
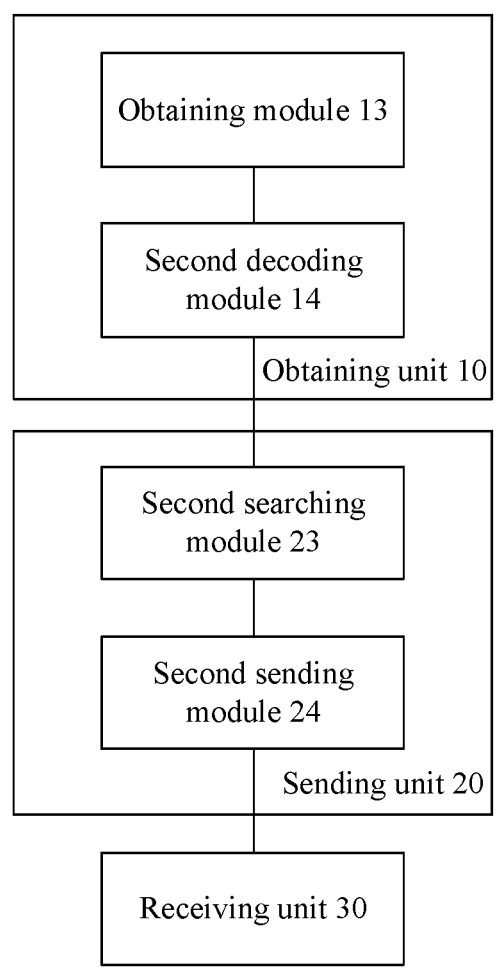
FIG. 17 is a schematic diagram of another information authentication apparatus based on a virtual reality scenario according to an example embodiment of this application.

FIG. 17 is a schematic diagram of another information authentication apparatus based on a virtual reality scenario according to an example embodiment of this application. As shown in FIG. 17, the information authentication apparatus based on the virtual reality scenario includes: an obtaining unit 10, a sending unit 20 and a receiving unit 30, where the obtaining unit 10 includes: an obtaining module 13, a second decoding module 14, and the sending unit 20 includes: a second searching module 23 and a second sending module 24.

It should be noted that, functions of the obtaining unit 10, the sending unit 20, the receiving unit 30, and the obtaining module 13 and the second decoding module 14 included in the obtaining unit 10 in this example embodiment are the same as functions of that of the information authentication apparatus based on the virtual reality scenario in the example embodiment shown in FIG. 16, and details are not described herein again.

The second searching module 23 is configured to search an API interface matching a type of the to-be-authenticated information by using the terminal.

The second searching module 23 searches the API interface matching the type of the to-be-authenticated information by the terminal, after the obtaining unit 10 obtains the to-be-authenticated information in the virtual reality scenario. In other words, the API interface matching the type of the to-be-authenticated information is identified from multiple API interfaces by the terminal. The terminal may be a smartphone, a tablet computer or the like. The terminal is installed with an application, and may be used for an authentication service.

The second sending module 24 is configured to send the to-be-authenticated information to the authentication device through the API interface if the API interface matching the type of the to-be-authenticated information is found.

The second searching module 23 sends, if the API interface matching the type of the to-be-authenticated information is found, the to-be-authenticated information to the authentication device through an API interface. In some example embodiments, the second sending module 24 sends the to-be-authenticated information to the authentication device through the API interface under 3G, 4G, or 5G network, and the authentication device may be an application, such as an instant messaging application and the like.

In some example embodiments, the image in the information authentication apparatus based on the virtual reality scenario includes: an image displaying a two-dimensional barcode.

In this example embodiment, the obtaining unit 10 obtains the to-be-authenticated information in the virtual reality scenario, the sending unit 20 sends the to-be-authenticated information to the authentication device in the reality scenario, where the authentication device is used for performing authentication on the to-be-authenticated information, and the receiving unit 30 receives the authentication result sent by the authentication device in the virtual reality scenario, where the authentication result is used for indicating that the to-be-authenticated information is authenticated successfully or fails to be authenticated. This application resolves a technical problem that an information authentication method in a virtual reality in related technologies is complex, thereby achieving a technical effect of simplifying the information authentication method in the virtual reality.

It should be noted that, the example implemented by the unit and the module and the corresponding steps is the same as in an application scenario, but is not limited to content disclosed in the foregoing example embodiments. It should be noted that, the unit and the module as a part of an apparatus may run in a hardware environment shown in FIG. 1, may be implemented by software, or may be implemented by hardware. In an example, the hardware environment may include a network environment.

A technical problem that an information authentication method in a virtual reality in related technologies is complex may be resolved by using the unit and the module, thereby achieving a technical effect of simplifying the information authentication method in the virtual reality.

According to an example embodiment of this application, an information authentication apparatus used for implementing an information authentication method based on the virtual reality scenario is further provide.

Figure 18:
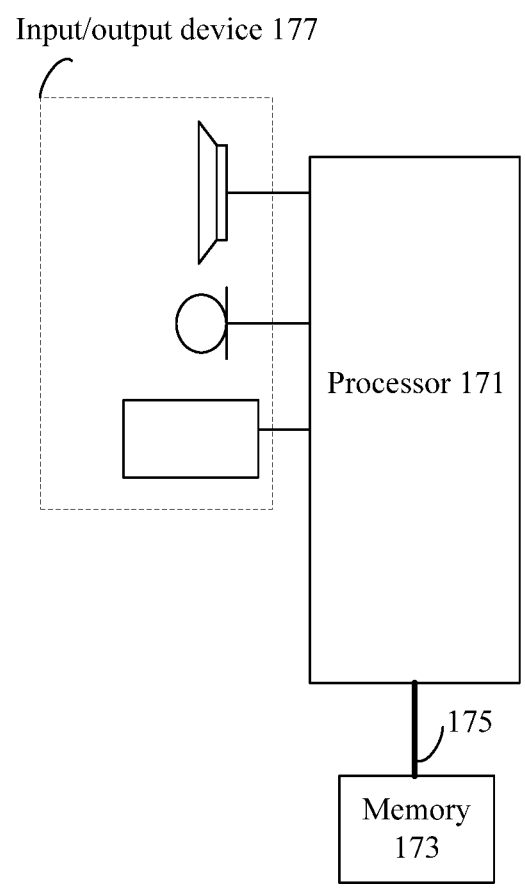
FIG. 18 is a structural block diagram of a virtual reality device according to an example embodiment of this application.

FIG. 18 is a structural block diagram of a virtual reality device according to an example embodiment of the present disclosure. As shown in FIG. 18, the virtual reality device may include: one or more (only one is described in the figure) processors 171, a memory 173, and a transmission apparatus 175 (such as the sending apparatus in the foregoing example embodiment). As shown in FIG. 18, the virtual reality device may further include an input/output device 177.

The memory 173 may be configured to store a software program and a module such as a program instruction/module corresponding to the information authentication method based on the virtual reality scenario in this example embodiment of this application, and the processor 171 runs the software program and the module stored in the memory 173 to execute various function applications and data processing, that is, implement the foregoing information authentication method based on the virtual reality scenario. The memory 173 may include a high-speed random memory, and may also include a nonvolatile memory such as one or more magnetic storage devices, a flash memory, or another nonvolatile solid-state memory. In some instances, the memory 173 may further include memories remotely disposed relative to the processor 171, and these remote memories may be connected to the virtual reality device through a network. Instances of the network include, but are not limited to, the Internet, an intranet, a local area network, a mobile communications network, and a combination thereof.

The transmission apparatus 175 is configured to receive or send data through a network, or may further be configured to transmit data between a processor and a memory. Specific examples of the foregoing network may include a wired network and a wireless network. In an example, the transmission apparatus 175 includes a network interface controller (NIC) that may be connected to another network device and a router by using a network cable, thereby communicating with the Internet or a local area network. In an instance, the transmission apparatus 175 is a radio frequency (RF) module that is configured to communicate with the Internet in a wireless manner.

Specifically, the memory 173 is configured to store an application.

The processor 171 may invoke, by using the transmission apparatus, the application stored in the memory 173, so as to execute the following steps:

Obtain to-be-authenticated information in a virtual reality scenario.

Send the to-be-authenticated information to an authentication device in a reality scenario, the authentication device being used for performing authentication on the to-be-authenticated information.

Receive an authentication result sent by the authentication device in the virtual reality scenario, the authentication result being used for indicating that the to-be-authenticated information is authenticated successfully or fails to be authenticated.

The processor 171 is further configured to execute the following steps: obtain an image displayed in the virtual reality scenario by scanning in the virtual reality scenario, the image being obtained by encoding the to-be-authenticated information; and decode the image, to obtain the to-be-authenticated information, the encoding corresponding to the decoding.

The processor 171 is further configured to execute the following steps: decode the image in the virtual reality scenario; search an API interface matching a type of the to-be-authenticated information in the virtual reality scenario; and send the to-be-authenticated information to the authentication device through the API interface in the virtual reality scenario if the API interface matching the type of the to-be-authenticated information is found.

The processor 171 is further configured to execute the following steps: obtain an image displayed in the virtual reality scenario with a terminal in the reality scenario, the image being obtained by encoding the to-be-authenticated information; decode the image, to obtain the to-be-authenticated information, the encoding corresponding to the decoding; and send the to-be-authenticated information to the authentication device.

The processor 171 is further configured to execute the following steps: search the API interface matching the type of the to-be-authenticated information by the terminal; send the to-be-authenticated information to the authentication device through the API interface if the API interface matching the type of the to-be-authenticated information is found.

A solution of an information authentication method based on a virtual reality scenario is provided by using example embodiments of this application. To-be-authenticated information in the virtual reality scenario is obtained; the to-be-authenticated information is sent to an authentication device in a reality scenario, the authentication device being used for performing authentication on the to-be-authenticated information; and an authentication result sent by the authentication device is received in the virtual reality scenario, the authentication result being used for indicating a solution that the to-be-authenticated information is authenticated successfully or fails to be authenticated so that an objective of performing authentication on the to-be-authenticated information in a virtual scenario is achieved, thereby implementing a technical effect of simplify an information authentication method in a virtual reality and resolving a technical problem that an information authentication method in a virtual reality in related technologies is complex.

Persons of ordinary skill in the art may understand that, the structure shown in FIG. 18 is merely a schematic, and, in some example embodiments, the virtual reality device may be a device such as a virtual reality helmet, a pair of virtual reality glasses, or a virtual reality all-in-one machine. FIG. 18 does not limit the structure of the foregoing virtual reality device. For example, the virtual reality device may further include more or less components (such as a network interface and a display apparatus) than those shown in FIG. 18, or has a configuration different from that shown in FIG. 18.

Persons of ordinary skill in the art may understand that all or a part of the steps of the methods of the foregoing example embodiments may be implemented by a program instructing relevant hardware of the virtual reality device. The program may be stored in a computer readable storage medium. The storage medium may include: a flash disk, a read-only memory (Read-Only Memory, ROM), a random access memory (Random Access Memory, RAM), a magnetic disk or an optical disc.

An example embodiment of the present disclosure further provides a virtual reality device. The virtual reality device includes a memory, a processor and a computer program being stored on the memory and may be executed on the processor, the processor executing the information authentication method based on the virtual reality scenario by using the computer program.

An example embodiment of this application further provides a storage medium. In some example embodiments, the foregoing storage medium may be used for executing program code of the information authentication method based on the virtual reality scenario.

In some example embodiments, the storage medium may locate on at least one network device of the multiple network devices in the network shown in the foregoing embodiment.

In some example embodiments, the storage medium is set to store program code used for executing the following program code:

Obtain to-be-authenticated information in a virtual reality scenario.

Send the to-be-authenticated information to an authentication device in a reality scenario, the authentication device being used for performing authentication on the to-be-authenticated information.

Receive an authentication result sent by the authentication device in the virtual reality scenario, the authentication result being used for indicating that the to-be-authenticated information is authenticated successfully or fails to be authenticated.

In some example embodiments, the storage medium is further set to store program code used for executing the following steps: obtain an image displayed in the virtual reality scenario by scanning in the virtual reality scenario, the image being obtained by encoding the to-be-authenticated information; and decode the image, to obtain the to-be-authenticated information, the encoding corresponding to the decoding.

In some example embodiments, the storage medium is further set to store program code used for executing the following steps: decode the image in the virtual reality scenario; search an API interface matching a type of the to-be-authenticated information in the virtual reality scenario; and send the to-be-authenticated information to the authentication device through the API interface in the virtual reality scenario if the API interface matching the type of the to-be-authenticated information is found.

In some example embodiments, the storage medium is further set to store program code used for executing the following steps: obtain an image displayed in the virtual reality scenario with a terminal in the reality scenario, the image being obtained by encoding the to-be-authenticated information; decode the image, to obtain the to-be-authenticated information, the encoding corresponding to the decoding; and send the to-be-authenticated information to the authentication device.

In some example embodiments, the storage medium is further set to store program code used for executing the following steps: search the API interface matching the type of the to-be-authenticated information by the terminal; send the to-be-authenticated information to the authentication device through the API interface if the API interface matching the type of the to-be-authenticated information is found.

In some example embodiments, the storage medium described above may include but is not limited to: any medium that may store program code, such as a USB flash drive, a read-only memory (ROM), a random access memory (RAM), a removable hard disk, a magnetic disk or an optical disc.

The sequence numbers of the preceding example embodiments of this application are merely for description purpose and do not indicate the preference of example embodiments.

The integrated unit in the foregoing example embodiment may be stored in the foregoing computer readable storage medium when being implemented in a form of a software functional module and sold or used as an independent product. Based on such an understanding, the technical solutions of some embodiments of this application essentially, or the part contributing to related art technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in example embodiments of this application.

In the foregoing example embodiments of this application, descriptions of the example embodiments have different emphases, and as for parts that are not described in detail in one embodiment, reference may be made to the relevant description of the other example embodiments.

In the several example embodiments provided in this application, it should be understood that the disclosed client may be implemented in other manners. The described apparatus example embodiment is merely a non-limiting example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may be or may not be physically separate, and parts displayed as units may be or may not be physical units, that is, may be located in one position, or may be distributed on a plurality of network unit. Some or all of the units may be selected according to actual requirements to achieve the objectives of the solutions of example embodiments.

In addition, functional units in the example embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely non-limiting example embodiments of this application, and it should be noted that persons of ordinary skill in the art may make various modifications and refinements without departing from the spirit of this application. All such modifications and refinements should also be intended to be covered by this application and the appended claims.

What is claimed is:

1. An information authentication method based on a virtual reality scenario, the information authentication method comprising:

controlling, by at least one processor, a virtual device according to an operation input by the user to the virtual device in the virtual reality scenario to scan an image presented to the user in the virtual reality scenario, the image encoding to-be-authenticated information the virtual device being rendered in the virtual reality scenario, and the virtual device and the virtual reality scenario being within a virtual reality world;

decoding, by at least one processor, the image to obtain the to-be-authenticated information;

sending, by at least one processor, the to-be-authenticated information to an authentication device in a reality scenario, the authentication device being used for performing authentication on the to-be-authenticated information; and receiving, by at least one processor in the virtual reality scenario, an authentication result sent by the authentication device, the authentication result indicating that the to-be-authenticated information is authenticated successfully or fails to be authenticated, wherein the to-be-authenticated information is sent via an instant messaging application to the authentication device in the reality scenario.

2. The method according to claim 1, wherein the decoding the image comprises: decoding, by at least one processor, the image in the virtual reality scenario; and the sending the to-be-authenticated information to an authentication device in the reality scenario comprises:
searching, by at least one processor, for an API interface matching a type of the to-be-authenticated information in the virtual reality scenario; and
sending, by at least one processor, the to-be-authenticated information to the authentication device through the API interface in the virtual reality scenario if the API interface matching the type is found.

3. The method according to claim 1, wherein the decoding the image comprises:
sending, by at least one processor, the image to a terminal, the terminal being used for decoding the image to obtain the to-be-authenticated information; and sending, by at least one processor, the to-be-authenticated information to an authentication device in a reality scenario comprises:
searching, by at least one processor with the terminal, for an API interface matching a type of the to-be-authenticated information, and
sending, by at least one processor, the to-be-authenticated information to the authentication device through the API interface if the API interface matching the type is found.

4. The method according to claim 1, wherein the obtaining to-be-authenticated information in the virtual reality scenario further comprises:
obtaining, by at least one processor with a terminal in the reality scenario, an image displayed in the virtual reality world and scanned by the virtual device, the image including the to-be-authenticated information in an encoded form; and
decoding, by at least one processor, the image to obtain the to-be-authenticated information; and
the sending the to-be-authenticated information to an authentication device in a reality scenario comprises:
sending, by at least one processor with the terminal, the to-be-authenticated information to the authentication device.

5. The method according to claim 4, wherein the sending the to-be-authenticated information to the authentication device comprises:
searching, by at least one processor with the terminal, for an API interface matching a type of the to-be-authenticated information; and
sending, by at least one processor, the to-be-authenticated information to the authentication device through the API interface if the API interface matching the type is found.

6. The method according to claim 1, wherein the image comprises a two-dimensional barcode displayed in the virtual world.

7. The method according to claim 4, wherein the image comprises a two-dimensional barcode displayed in the virtual world.

8. An apparatus comprising:
at least one memory configured to store computer program code; and
at least one processor configured to access the at least one memory and operate according to the computer program code, the computer program code comprising:
obtaining code configured to cause at least one of the at least one processor to control a virtual device according to an operation input by the user to the virtual device in the virtual reality scenario to scan an image presented to the user in the virtual reality scenario, the image encoding to-be-authenticated information, the virtual device being rendered in the virtual reality scenario, and the virtual device and the virtual reality scenario being within a virtual reality world;
decoding code configured to cause at least one of the at least one processor to decode the image to obtain the to-be-authenticated information;
sending code configured to cause at least one of the at least one processor to send the to-be-authenticated information to an authentication device in a reality scenario, the authentication device being used for performing authentication on the to-be-authenticated information; and
receiving code configured to cause at least one of the at least one processor to receive, in a virtual reality scenario, an authentication result sent by the authentication device, the authentication result indicating that the to-be-authenticated information is authenticated successfully or fails to be authenticated,
wherein the to-be-authenticated information is sent via an instant messaging application to the authentication device in the reality scenario.

9. The apparatus according to claim 8, wherein the decoding code is configured to cause the at least one of the at least one processor to decode the image in the virtual reality scenario; and
the sending code comprises:
searching code configured to cause at least one of the at least one processor to search for an API interface matching a type of the to-be-authenticated information in the virtual reality scenario; and
sending subcode configured to cause at least one of the at least one processor to send the to-be-authenticated information to the authentication device through the API interface in the virtual reality scenario if the API interface matching the type is found.

10. The apparatus according to claim 8, wherein the decoding code is configured to cause the at least one of the at least one processor to send the image to a terminal, the terminal being used for decoding the image to obtain the to-be-authenticated information; and
the sending code is configured to cause the at least one of the at least one processor to search, with the terminal, for an API interface matching a type of the to-be-authenticated information, and send the to-be-authenticated information to the authentication device through the API interface if the API interface matching the type is found.

11. The apparatus according to claim 8, wherein the obtaining code comprises:
obtaining subcode configured to cause at least one of the at least one processor to obtain, with a terminal in the reality scenario, an image displayed in the virtual reality world and scanned by the virtual device, the image including the to-be-authenticated information in an encoded form; and decoding code configured to cause at least one of the at least one processor to decode the image to obtain the to-be-authenticated information; and the sending code is configured to cause the at least one of the at least one processor to send, with the terminal, the to-be-authenticated information to the authentication device.

12. The apparatus according to claim 11, wherein the sending code comprises:

searching code configured to cause at least one of the at least one processor to search, with the terminal, for an API interface matching a type of the to-be-authenticated information; and sending code configured to cause at least one of the at least one processor to send the to-be-authenticated information to the authentication device through the API interface if the API interface matching the type is found.

13. The apparatus according to claim 8, wherein the image comprises a two-dimensional barcode displayed in the virtual world.

14. The apparatus according to claim 11, wherein the image comprises a two-dimensional barcode displayed in the virtual world.

15. A non-transitory computer readable storage medium, storing a program which, when executed by a processor, performs operations comprising:

controlling a virtual device according to an operation input by the user to the virtual device in the virtual reality scenario to scan an image presented to the user in the virtual reality scenario, the image encoding to-be-authenticated information, the virtual device being rendered in the virtual reality scenario, and the virtual device and the virtual reality scenario being within a virtual reality world;

decoding the image to obtain the to-be-authenticated information;

sending the to-be-authenticated information to an authentication device in a reality scenario, the authentication device being used for performing authentication on the to-be-authenticated information; and receiving, in the virtual reality scenario, an authentication result sent by the authentication device, the authentication result indicating that the to-be-authenticated information is authenticated successfully or fails to be authenticated, wherein the to-be-authenticated information is sent via an instant messaging application to the authentication device in the reality scenario.

16. The method according to claim 1, further comprising:

activating, by at least one processor, according to a first operation input by a user to a virtual device in a virtual reality scenario, a capture program on the virtual device, the virtual device being rendered in the virtual reality scenario and being operated by the user in the virtual reality scenario and the virtual device and the virtual reality scenario being within a virtual reality world.

* * * * *